United States Patent
Hesselink et al.

(10) Patent No.: US 6,807,131 B1
(45) Date of Patent: Oct. 19, 2004

(54) NEAR-FIELD HYBRID MAGNETIC-OPTICAL HEAD SYSTEM

(75) Inventors: Lambertus Hesselink, Atherton, CA (US); Douglas G. Stinson, Fremont, CA (US); Robert L. Thornton, Los Altos, CA (US); Roger F. Malmhäll, Mountain View, CA (US)

(73) Assignee: Research Investment Network, Inc., Irvine, CA (US)

( * ) Notice: Subject to any disclaimer, the term of this patent is extended or adjusted under 35 U.S.C. 154(b) by 416 days.

(21) Appl. No.: 09/751,301

(22) Filed: Dec. 27, 2000

(51) Int. Cl.⁷ .............................................. G11B 11/12
(52) U.S. Cl. .................................................... 369/13.13
(58) Field of Search ........................... 369/13.13, 13.17, 369/13.41, 112.07, 112.08; 360/235.8, 236.6

(56) References Cited

U.S. PATENT DOCUMENTS

| | | | |
|---|---|---|---|
| 5,140,569 A * | 8/1992 | Nebashi .................... | 369/13.17 |
| 5,926,444 A * | 7/1999 | Hirokane et al. ......... | 369/13.41 |
| 5,973,881 A * | 10/1999 | Ajiki ........................ | 360/235.8 |
| 6,304,418 B1 * | 10/2001 | Boutaghou et al. ....... | 360/236.6 |
| 6,351,443 B1 * | 2/2002 | Freeman ................. | 369/112.07 |
| 6,556,517 B1 * | 4/2003 | Nakajima ................. | 369/13.13 |
| 2001/0030928 A1 * | 10/2001 | Cheong et al. ......... | 369/112.08 |

* cited by examiner

Primary Examiner—Tianjie Chen
(74) Attorney, Agent, or Firm—Keiji Masaki; Steve Wong; Caroline Do

(57) ABSTRACT

A hybrid magnetic-optical head apparatus wherein one or more solid state lasers, magnetic field biasing elements, magnetic sensing elements, and an aerodynamically shaped slider comprise a single integrated, monolithic device fabricated from the same base semiconductor material into an optical head. The monolithic optical head can be quickly and easily attached to the read arm of an optical read/write device without requiring attachment of separate laser and magnetic elements, and without micropositioning or use of optical microscopy for positioning the lasers or magnetic elements. The hybrid magnetic-optical head apparatus includes a magnetic-optical function region having a semiconductor laser and at least one magnetic element. Preferably, the magnetic-optical function region of the substrate includes a magnetic field biasing element associated with the semiconductor laser, as well as a magnetic sensing element. The slider portion of the magnetic optical head preferably includes an aerodynamically shaped air cavity as well as an air bearing surface, with the emission face of the laser preferably is substantially co-planar with the air bearing surface. The magnetic-optical function region may be configured for magnetically assisted thermal recording wherein writing is carried out primarily by laser power modulation to selectively heat portions of a medium, together with assistance of an applied magnetic field to establish a preferred direction of magnetization pattern in the medium. The magnetic-optical function region may alternatively be configured for thermally assisted magnetic writing wherein writing is carried out primarily by modulation of magnetic field, together with assistance of a laser which heats the medium to reduce the medium coercivity and thereby assist in the magnetic recording.

21 Claims, 19 Drawing Sheets

NEAR-FIELD HYBRID MAGNETIC-OPTICAL HEAD SYSTEM

RELATED APPLICATION DATA

This patent application is related to: U.S. patent application Ser. No. 09/495,552 filed on Feb. 1, 2000; U.S. patent application Ser. No. 09/495,557 filed on Feb. 1, 2000; U.S. patent application Ser. No. 09/495,558 filed on Feb. 1, 2000; and U.S. patent application Ser. No. 09/495,636, filed on Feb. 1, 2000.

BACKGROUND OF THE INVENTION

1. Field of the Invention

This invention pertains generally to optical and magneto-optic head devices, systems and methods for reading magneto-optical media, and more particularly to a near-field hybrid magnetic-optical system and method wherein one or more small aperture semiconductor lasers and one or more magnetic read and/or write elements are formed on a slider as a single, integrated monolithic device.

2. Description of the Background Art

The optical head of an optical read/write system can operate as a "flying head" wherein the optical head does not contact the adjacent optical medium, but is positioned close to the optical medium and separated by an air gap. The optical head includes an aerodynamically designed slider with an air bearing surface for maintaining an air cushion between the optical head and the optical medium. One or more solid state lasers are typically mounted on the slider and are positioned to read and/or write onto the optical medium. The slider is typically mounted on a read arm by a spring mechanism, with the bias of the spring mechanism and the aerodynamic shape of the slider determining the distance between the optical head and optical medium.

Conventionally, the solid state laser and slider are separate components made of different materials. The slider, for example, may comprise a metallized SiC or $TiC/Al_2O_3$ body which has been appropriately shaped for aerodynamic properties. A solid state laser or: lasers are mechanically attached to the slider subsequent to its fabrication. An exemplary prior art attachment process involves careful positioning of the slider on an optical flat, applying a suitable quantity of adhesive or solder to the appropriate locations on the slider, and then urging the laser or lasers along the optical flat into position using micropositioners or microtranslation apparatus. This procedure is generally carried out under an optical microscope. When the adhesive cures, the emission face of the laser should be essentially flush with the slider air-bearing surface.

In the case of magneto-optic heads, additional magnetic components must generally be attached to the slider. Magneto-optic heads typically use a laser that is external to the slider, with laser output directed to the slider via optical fiber or fibers. A reflector and objective optics are coupled to the optical head to direct the laser output towards the magneto-optical medium. A flux element or coil is attached to the slider for magnetic recording or magnetically assisted recording, and magnetoresistive or giant magnetoresistive read element may be attached as well, together with conductors for the coil and magnetic read element.

The procedures for mechanical attachment of components to a slider are difficult and time-intensive. The machining and mechanical alignment tolerances for such attachment are high, generally on the order of 15 nanometers. Improper attachment of the laser and other components cannot generally be corrected. The preparation of optical and magneto-optic heads in this manner has thus involved considerable expense.

There is accordingly a need for a magneto-optical head apparatus and method which avoids complex, difficult and expensive mechanical attachment procedures for securing optical and magnetic components to a slider. The present invention satisfies this need, as well as others, and generally overcomes the deficiencies found in the background art.

SUMMARY OF THE INVENTION

The invention is a hybrid magnetic-optical head apparatus wherein one or more solid state lasers, magnetic field biasing elements, magnetic sensing elements, and an aerodynamically shaped slider comprise a single integrated, monolithic device fabricated from the same base semiconductor material into an optical head. The monolithic optical head can be quickly and easily attached to the read arm of an optical read/write device without requiring attachment of separate laser and magnetic elements, and without micropositioning or use of optical microscopy for positioning the lasers or magnetic elements.

More specifically, the invention is a hybrid magnetic-optical head apparatus comprising a single semiconductor substrate including a first, slider region having an air bearing surface, and a second, magnetic-optical function region having a semiconductor laser and at least one magnetic element. Preferably, the magnetic-optical function region of the substrate includes a magnetic field biasing element associated with the semiconductor laser, as well as a magnetic sensing element. The slider region preferably includes an aerodynamically shaped air cavity as well as the air bearing surface, and the emission face of the laser preferably is substantially co-planar with the air bearing surface.

The magnetic-optical function region may be configured for magnetically assisted thermal recording wherein writing is carried out primarily by laser power modulation to selectively heat portions of a medium, together with assistance of an applied magnetic field to establish a preferred direction of magnetization pattern in the medium. The magnetic-optical function region may alternatively be configured for thermally assisted magnetic writing wherein writing is carried out primarily by modulation of magnetic field, together with assistance of a laser which heats the medium to reduce the medium coercivity and thereby assist in the magnetic recording.

By way of example, and not necessarily of limitation, the semiconductor substrate preferably comprises a first conductivity-type clad layer or reflective layer, a second conductivity-type clad layer or reflective layer, an active region positioned between the first conductivity-type clad layer and second conductivity-type clad layer, and a base or substrate layer of first conductivity-type semiconductor material.

By way of further example, the first conductivity-type base layer preferably comprises a layer of n-semiconductor material, while the first conductivity-type clad layer is an n-clad layer, and the second conductivity-type-clad layer is a p-clad layer. The n-clad layer or reflective layer is adjacent a first side of the active region, and the p-clad layer or reflective layer is adjacent a second side of the active layer. Preferably, one or more insulating layers are included above or on top of the p-clad layer. The semiconductor substrate is formed or grown by conventional techniques such that the n-clad layer is deposited on the n-semiconductor base layer, the active region is deposited on the n-clad layer, and the p-clad layer is deposited on the active region. The outer surface of the n-semiconductor base layer defines the n-side of the substrate, while the outer surface of insulating layer proximate to the p-clad layer defines the p-side of the substrate.

A first section or portion of the semiconductor substrate provides a slider region and includes an air bearing surface and air cavity which are aerodynamically structured and configured to define a slider for the optical head. Preferably, the air bearing surface is formed on the outermost insulating layer on the p-side of the substrate. In other embodiments of the invention, an outermost metal layer may be included on the p-side of the substrate on top of the insulating layer, with the air bearing surface defined in the metal layer.

A second portion or section of the semiconductor substrate comprises a magnetic-optical function region which preferably includes a semiconductor laser and one or more magnetic elements. A p-electrical contact adjacent to the p-clad layer and an n-electrical contact adjacent to the n-semiconductor material layer on the opposite side of the semiconductor substrate define generally a diode laser structure across the substrate. The optical mode of the laser may additionally, or alternatively be defined by oxidized or ion-implanted regions associated with the p-clad layer or n-clad layer, as is well known in the art.

The magnetic elements in the magnetic-optical function region will generally include a magnetic field biasing element or flux element associated with the laser. In preferred embodiments of the invention utilizing a magnetically assisted thermal writing scheme, the magnetic field biasing element is preferably in the form of a magnetic coil surrounding the laser emission facet and positioned within or between insulating layers of the substrate surrounding the emission facet such that the magnetic coil is recessed with respect to the emission facet and air bearing surface.

In embodiments of the invention utilizing a thermally assisted magnetic writing scheme, the magnetic field biasing element preferably comprises a soft magnetic yoke element associated with the emission facet of the laser, together with one or more magnetic coils in association with the yoke. The magnetic-optical function region will also generally include a magnetic sensing or read element, preferably in the form of a giant magnetoresistive (GMR) sensor, which is preferably positioned such that its exposed edge is substantially co-planar with the laser emission facet and air bearing surface.

In one preferred embodiment of the invention, the active layer in the semiconductor substrate comprises a plurality of quantum well and quantum barrier structures. The p-clad layer preferably comprises a p-doped set of distributed Bragg reflector or DBR mirrors adjacent a first, upper surface of the active layer, and the n-clad layer preferably comprises an n-doped set of DBR mirrors adjacent a second, lower surface of the active layer. The p-doped DBR mirror set preferably comprises a plurality of p-doped, quarter wave dielectric layer pairs, and the n-doped DBR mirror set preferably comprises a plurality of n-doped quarter wave dielectric layer pairs. A p-doped semiconductor layer may be included between the quantum well active layer and the p-doped DBR mirror set, and an n-doped semiconductor layer may be included between the quantum well active region and the n-doped DBR mirror set. An insulating layer is positioned on a top or outer surface of the p-doped DBR mirror set, and a reflective metal layer is located on a top or outer surface of the insulating layer. The n-doped semiconductor base layer is included adjacent a lower, outer surface of the n-DBR mirror set.

In another preferred embodiment of the invention, the p-electrical contact is provided as an annular-shaped metal pad in electrical contact with the top surface of the p-DBR mirror set. The n-side electrical contact is provided as a metal pad positioned in electrical contact with the n-type base semiconductor layer. The p-side and n-side contacts define a vertical cavity surface emitting laser (VCSEL) structure, with an emission facet provided in the center of the p-side contact. Preferably, an aperture is cut or etched through the outermost insulating layer or layers at the emission facet to provide for optical output from the emission facet in a narrow beam for near-field use.

The laser, magnetic field biasing element, and magnetic sensing element are all integral portions of the bulk semiconductor substrate which provides the slider region and magnetic-optical function region of the hybrid magnetic-optical head. In order to maintain the aerodynamic structure of the slider portion of the magnetic-optical head, the electrical conductors and connections associated with the laser, magnetic field biasing element, and magnetic sensing element on the p-side of the substrate must be structured and configured such that they do not extend above or otherwise interfere with the air bearing surface and air cavity of the slider portion. In this regard, the invention advantageously uses a plurality of conductive vias or through-ways which extend through the substrate, from the n-side to the p-side, so that all of the wire bonding pads necessary for the laser, magnetic field biasing element and magnetic sensing element can be located on the n-side of the substrate, well away or remote from the air bearing surface and air cavity on the p-side of the substrate.

Preferably, a first conductive via extends through the substrate and electrically connects a first wire bonding pad on the n-side of the substrate with a first conductor element on the p-side of the substrate. The first p-side conductor element in turn connects to the p-side electrical contact for the laser, so that electrical connection to the p-side laser contact can be achieved through the first n-side wire bonding pad. A second conductive via similarly extends through the substrate and electrically connects a second n-side wire bonding pad to a second p-side conductor element. The second p-side conductor element is connected to a plus (positive) contact for the magnetic field biasing element. Likewise, a third conductive via extends through the substrate and electrically connects a third n-side wire bonding pad to a third p-side conductor, which is in turn connected to a minus (negative) contact for the magnetic field biasing element. A fourth conductive via extends through the substrate and electrically connects a fourth n-side wire bonding pad to a fourth p-side conductor element, which in turn connects to a plus (positive) contact for the magnetic sensing element. In the same manner, a fifth conductive via extends through the substrate and electrically connects a fifth n-side wire bonding pad to a fifth p-side conductor element, which in turn connects to a minus (negative) for the magnetic sensing element.

The five p-side conductor elements are preferably recessed or flush with respect to the emission face of the magnetic-optical function region and air bearing surface of the slider region, so that the p-side electrical conductors do not extend above the air bearing surface, thereby maintaining the aerodynamic structure of the slider region. The outermost insulating layer or layers on the p-side of the substrate may cover one or more of the p-side electrical conductors, or, alternatively, one or more of the p-side electrical conductors may be recessed into the outermost insulating layer or layers.

The invention also provides a method for preparing an optical head which comprises, in general terms, preparing a semiconductor substrate, forming or defining at least one magnetic-optical function region on the semiconductor substrate, and forming or defining a slider region on the semiconductor substrate. More preferably, the preparing of the semiconductor substrate comprises providing a layer of n-semiconductor, depositing an n-clad layer thereon, depositing an active layer on the n-clad layer, depositing a p-clad layer on the active layer, and depositing at least one insulating layer on the p-clad layer. Forming the semiconductor substrate may additionally comprise depositing a metal layer on the insulating layer. The semiconductor substrate is preferably formed via conventional low-cost, high volume semiconductor fabrication methods using metal organic vaporphase epitaxy (MOVPE), liquid phase epitaxy (LPE), molecular beam epitaxy (MBE), or other deposition techniques.

The defining of the magnetic-optical function region preferably comprises depositing a p-side electrical contact on the p-clad layer and an n-side electrical contact on the n-semiconductor layer to define a diode laser structure across the substrate, depositing a magnetic field biasing element on an insulating layer proximate the p-side of the substrate and the emission facet of the laser, and depositing a magnetic sensor element on an insulating layer proximate the p-side of the substrate.

The defining of the magnetic-optical function region will also preferably comprise forming a plurality of conductive vias extending through the substrate, forming a plurality of n-side wire-bonding pads which connect to corresponding ones of the conductive vias, and forming a plurality of p-side conductor elements which connect to corresponding ones of the conductive vias, and which are also in electrical connection with the p-side electrical contact for the laser, p-side electrical contacts for the magnetic field biasing element, and p-side electrical contacts for the magnetic sensor element. The defining of the magnetic-optical is function region also preferably comprises etching or cutting an aperture through the outermost layer or layers on the laser emission facet.

The defining of the slider region is carried out by selecitvely depositing or etching an outermost insulating layer on the p-surface of the semiconductor substrate to define an air flow cavity, with the air-bearing surface being defined by the outer surface of the insulating layer around the air flow cavity. The air bearing surface is configured such that it is substantially co-planar with the emission face of the diode laser defined in the magnetic-optical function region. The material of the air bearing surface on the slider region, and the outermost layer on the emission facet may comprise the same material layer. In embodiments wherein an outer metal layer is included on the dielectric layer and an aperture is cut in the laser emission facet, the air bearing surface layer and outer layer of the emission facet will comprise the outer metal layer. Where the metal layer is omitted, the air bearing surface and emission facet will comprise the outermost dielectric layer of the substrate.

The semiconductor substrate may alternatively comprise an n-p, rather than a p-n structure, in which case the preparing of the semiconductor substrate would comprise providing a layer of p-semiconductor, depositing an p-clad layer thereon, depositing an active layer on the p-clad layer, depositing a n-clad layer on the active layer, and depositing at least one insulating layer on the n-clad layer.

The hybrid magnetic-optical head of the invention as thus prepared, is a single monolithic device made of a single substrate comprising an aerodynamic slider together with a semiconductor laser and one or more magnetic elements which are integral portions of the substrate. The invention thus avoids any complex and time-consuming positioning and attachment of the laser, magnetic elements, fiberoptics, or conductor elements on the slider, as has been heretofore required with previously used optical and magneto-optic heads.

The hybrid magnetic-optical head of the invention is preferably utilized in a near-field magnetic-optic system wherein the monolithic magnetic-optical head is mounted on a read/write arm via a suspension mechanism, and is used to read and write on magneto-optic media. The magnetic-optic system in accordance with the invention comprises generally a monolithic hybrid magnetic-optical head having a slider, an integral laser, an integral magnetic field bias element and a magnetic sensing element, a read/write arm coupled to the monolithic magnetic-optical head via a suspension mechanism, and an magneto-optic medium positioned adjacent to the monolithic magnetic-optical head. The laser in the magnetic-optical head preferably includes an aperture in an emission facet which is structured and configured for near-field use, wherein the width w of the aperture is generally of smaller dimension than the output wavelength $\lambda$ of the laser. The reflective read/write surface of the magneto-optical medium, during read/write operations, is preferably positioned at an optical path-length 1 from the laser emission facet such that the optical path-length 1 is generally less than or smaller than the output wavelength $\lambda$.

The magneto-optic media used with the system of the invention preferably comprise thermomagnetic media having a readout layer and a memory or recording layer. The outer, readout layer may comprise, for example, a TbDy-FeCo alloy or the like, while the inner, memory layer may comprise a TbFeCo alloy or the like. An outer protective coating of silicon nitride or a like material is preferably included proximate to the readout layer, and an inner protective coating of silicon nitride or a like material is preferably included proximate to the memory layer. The readout layer, memory layer and protective layers are preferably mounted on a substrate of polycarbonate, glass, or like substrate material.

The invention further comprises a near-field magnetic-optical method comprising providing an monolithic hybrid magnetic-optic head having an integral slider, laser, magnetic field biasing element and magnetic sensing element, positioning the monolithic magnetic-optic head adjacent to the a magneto-optic medium, and irradiating the optical medium with the laser while a magnetic field is simultaneously applied to the medium by the biasing element to effect writing on the medium. The writing may be carried out primarily via magnetically assisted thermal writing wherein laser power modulation provides thermal writing together magnetic field assistance from the magnetic field biasing element to effect magnetization in the medium, with or primarily via thermally assisted magnetic writing wherein writing is effected via modulation of magnetic field by the magnetic field biasing element together with thermal assistance from the laser to reduce coercivity in the medium.

The method of the invention also preferably comprises reading of the optical medium via a magnetic sensing element included on the magneto-optic head. A lubricant layer may be positioned between the magnetic-optic head and magneto-optic medium during reading and writing operations. Preferably, the laser includes an aperture in its emission facet of width w which is generally of smaller dimension than the output wavelength $\lambda$ of the laser, and the irradiating is carried out with the laser positioned such that the emission facet is positioned at an optical path-length l from the read/write surface of the medium, with the optical path-length being generally smaller than the output wavelength λ.

Further advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
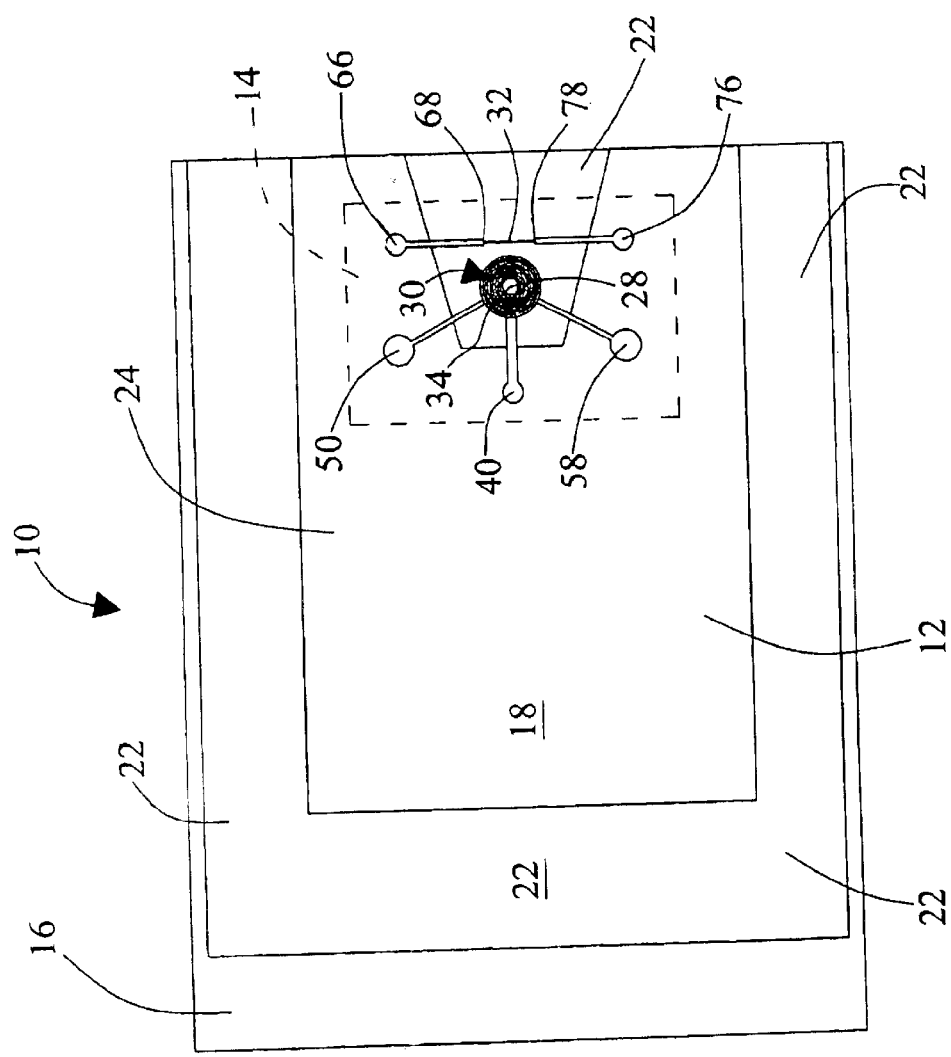
FIG. 1 is a bottom plan view of one preferred embodiment of a monolithic, hybrid magnetic-optical head in accordance with the present invention.

Referring more specifically to the drawings, for illustrative purposes the present invention is embodied in the apparatus and method shown generally in FIG. 1 through FIG. 11. It will be appreciated that the apparatus and system may vary as to configuration and as to details of the parts, and that the method may vary as to details and the order of events, without departing from the basic concepts as disclosed herein. The invention is disclosed generally in terms of use of GaAs and AlGaAs substrate materials, and semiconductor lasers in a vertical cavity surface emitting laser (VCSEL) configuration. However, it will be readily apparent to those skilled in the art that different semiconductor materials and other semiconductor laser configurations may be utilized with the invention. It will also be clear to those skilled in the art that various portions of the magnetic optical head apparatus of the invention as shown in the drawings have been exaggerated for reasons of clarity, and are not necessarily shown to scale.

Figure 2:
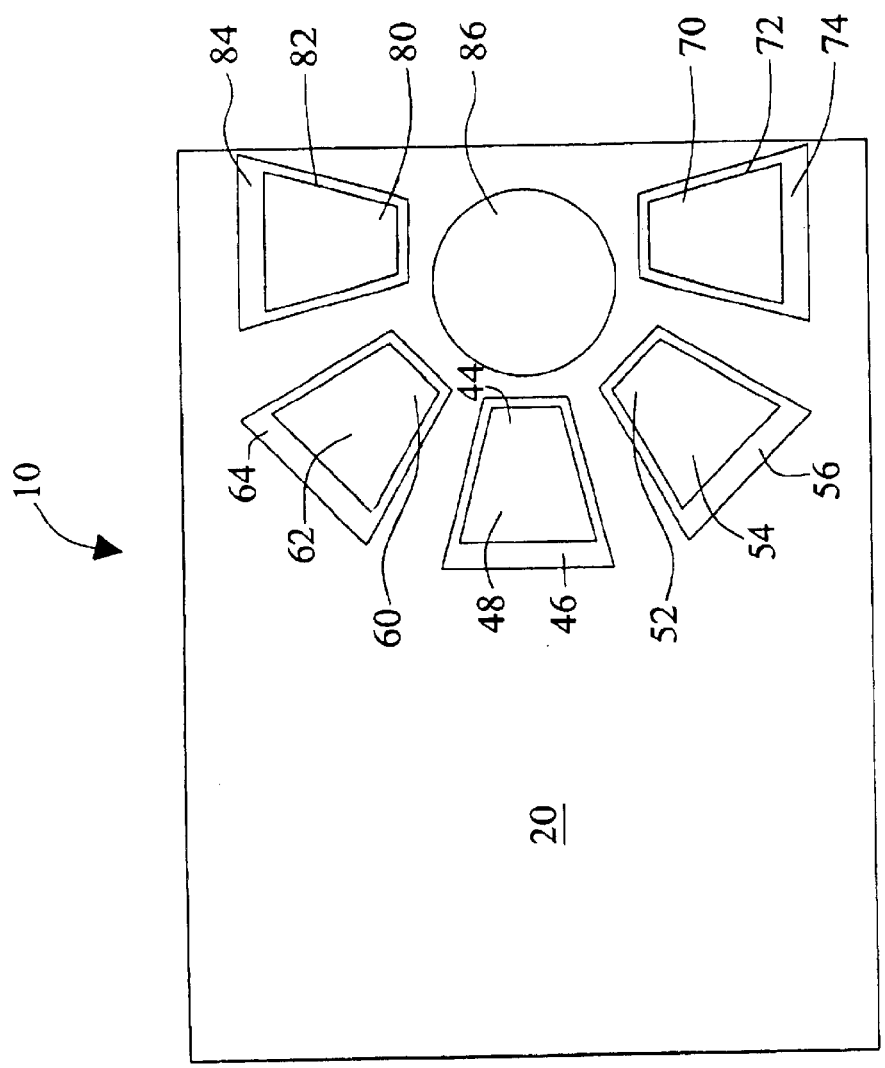
FIG. 2 is a top plan view of the magnetic-optical head of FIG. 1.

Referring first to FIG. 1 through FIG. 4, there is shown a hybrid magnetic-optical head apparatus 10 in accordance with one presently preferred embodiment of the invention. The magnetic-optical head apparatus 10 comprises generally a slider region or portion 12 and a magnetic-optical function region or portion 14 which are fabricated from a single, monolithic semiconductor substrate 16. FIG. 1 illustrates generally the side or portion of the magnetic-optical head 10 which faces towards an optical medium (not shown) during read and write operations, while FIG. 2 shows generally the side or portion of head 10 which faces away from the optical medium during operation. Semiconductor substrate 16 includes a p-side 18 and an n-side 20, as described further below, and, in the presently preferred embodiments, the p-side 18 of substrate 16 faces towards the optical medium during operation, while the n-side 20 faces away from the medium.

The slider region 12 of head 10 includes an aerodynamically shaped air bearing surface 22 and air cavity 24, which are defined generally by a patterned layer 26 of insulating material on the p-side 18 of substrate. The thickness of layer 26 is shown as exaggerated in thickness for clarity. Portions of the air bearing surface 22 and air cavity 24 extend into the magnetic-optical function region 14 of head 10. The structure and configuration of air bearing surface 22 and air cavity 24 may be varied as required for different uses of the invention. The design considerations for air: bearing surfaces and air cavities for sliders are well known in the art and are not:described herein.

Figure 3:
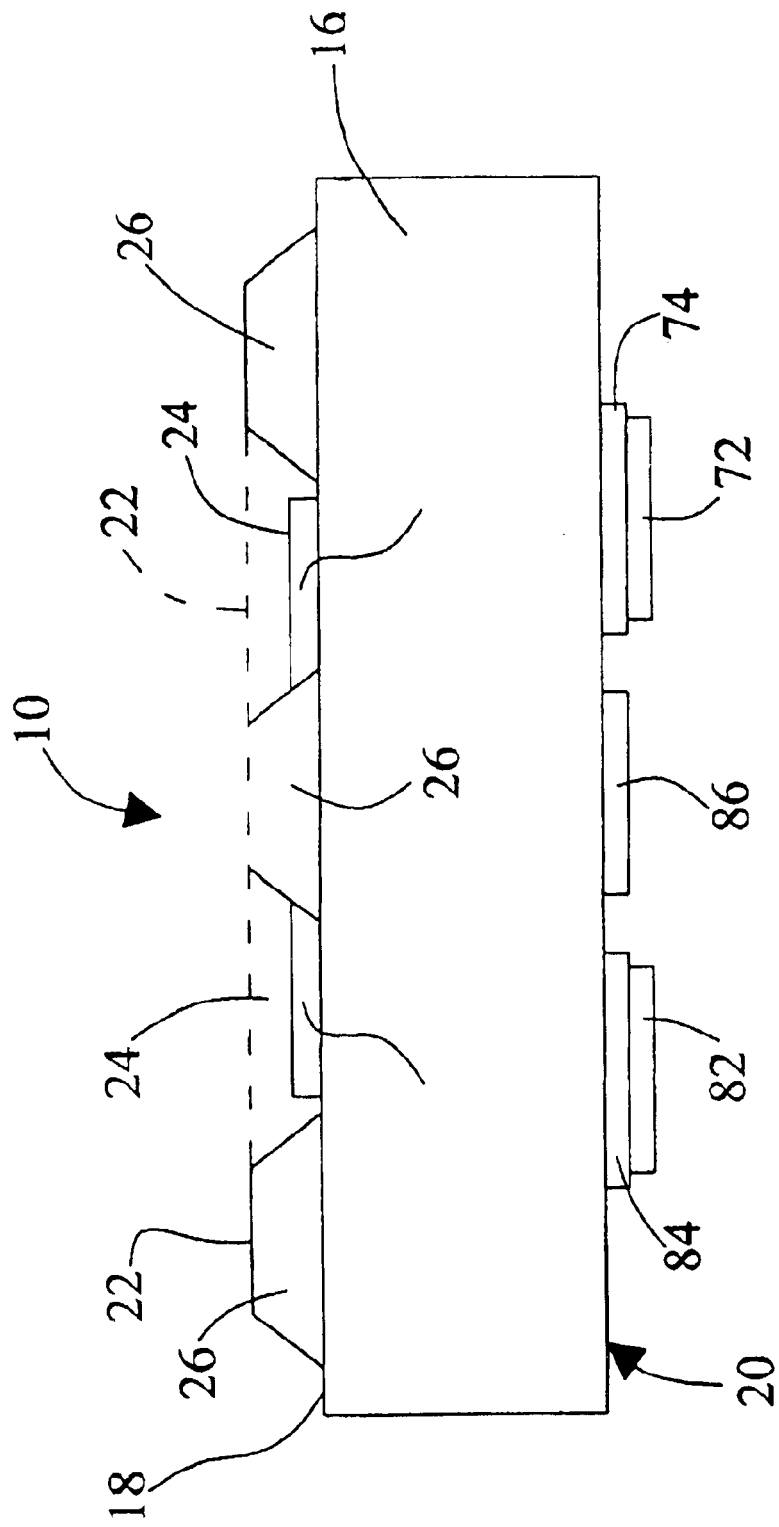
FIG. 3 is a front elevation view of the magnetic-optical head of FIG. 1.
Figure 4:
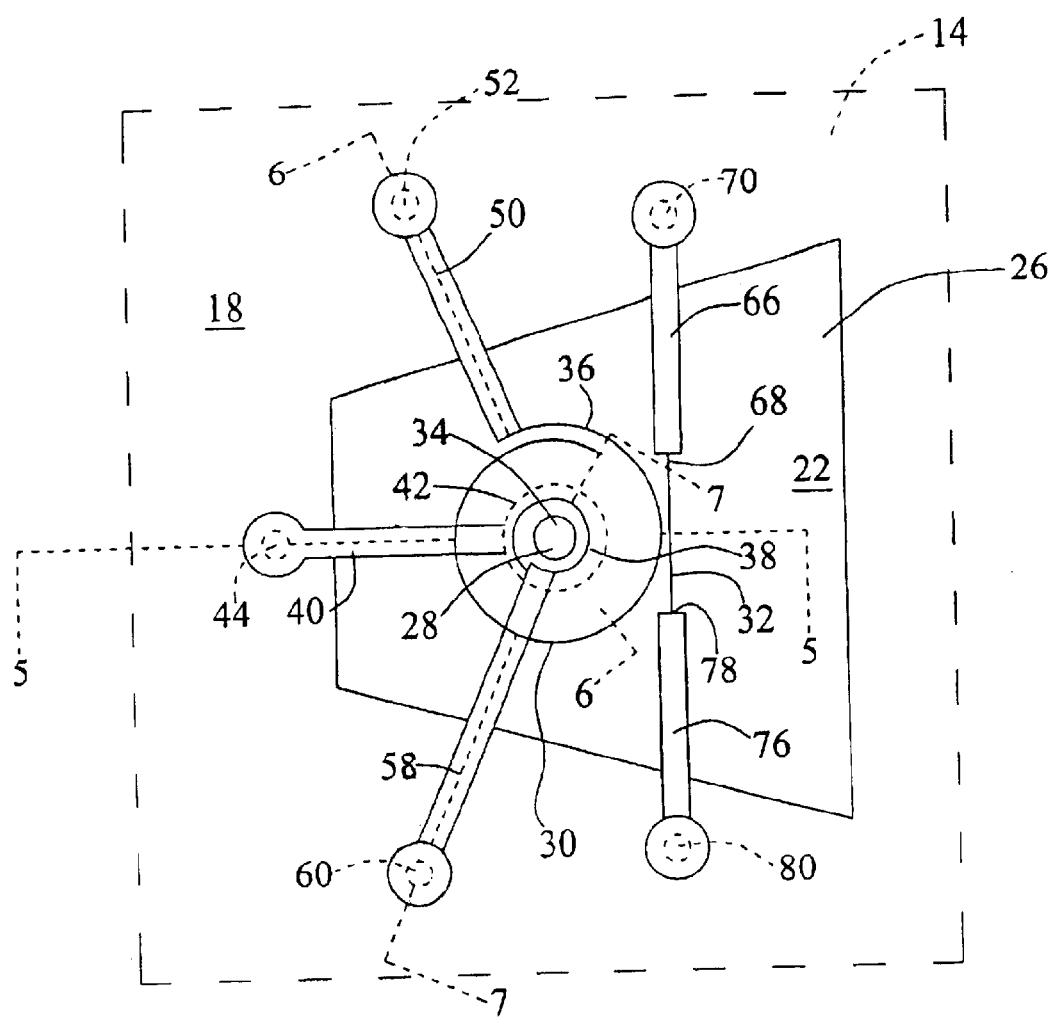
FIG. 4 is a bottom plan view of the magnetic-optical function region of the magnetic-optical head of FIG. 1.

Referring also to FIG. 4 as well as FIG. 1 through FIG. 3, the magnetic optical function region 14 preferably includes at least one laser 28, at least one magnetic field biasing element shown as a magnetic coil 30, and at least one magnetic sensing element shown as a giant magnetoresistive (GMR) read element 32. Laser 28 is a semiconductor or solid state laser as described further below.

Magnetic coil 30 is positioned such that it generally surrounds the emission facet 34 of laser 28. Magnetic coil 30 includes a plurality of convolutions of conductive material, the number and configuration of which may be varied depending upon the particular use of the invention. For reasons of clarity, only the outermost convolution 36 and innermost convolution 37 of coil 30 are shown in FIG. 4. The outermost insulating layer 26 will generally cover coil 30, as described further below. For reasons of clarity, however, coil 30 is shown in FIG. 1 and FIG. 3 as uncovered by insulating layer 26. The preferred location of coil 30 with respect to various insulating layers of substrate 16 is discussed further below.

Figure 5:
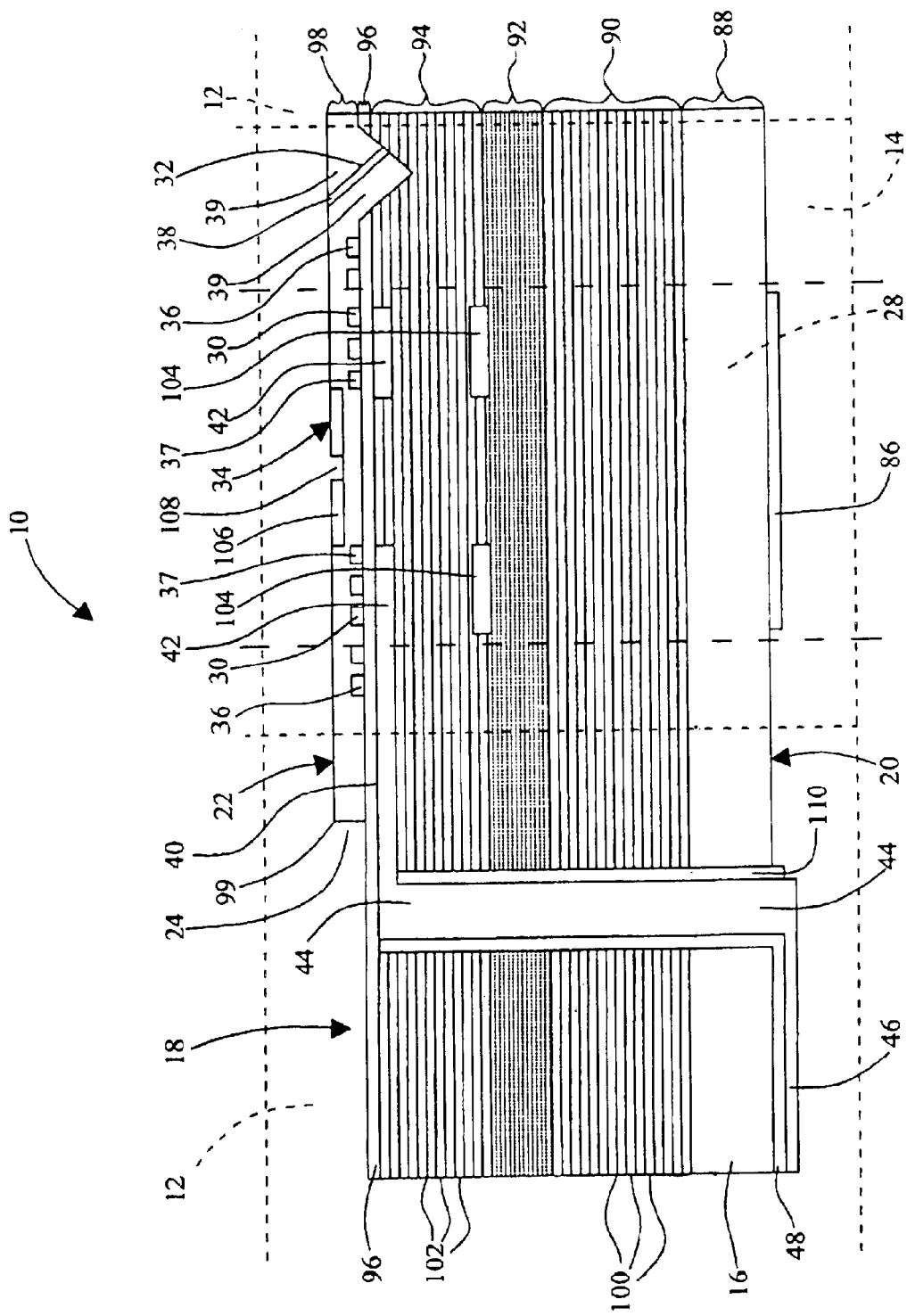
FIG. 5 is a side elevation view in cross-section of the magnetic-optical function region of FIG. 4 taken through line 5—5.

The GMR sensor element 32 includes an active region 38 (FIG. 5), surrounded by a region 39 of dielectric buffer material. The size of GMR element 32 as shown in FIG. 5 has been exaggerated for clarity, and is not necessarily shown to scale. Typically, the active region 38 will comprise laminate structure which includes a first layer (layers not shown) of ferromagnetic metal or metal alloy, a layer of non-magnetic metal or metal alloy, a second layer of ferromagnetic metal or metal alloy, and pinning layer of anti-ferromagnetic material. Preferably, layers (not shown) of soft magnetic material are included above and below the laminate active region 38. In the preferred embodiments, the first ferromagnetic layer will comprise NiFe, the non-magnetic metal comprises Cu, the second ferromagnetic layer comprises Co, and the anti-ferromagnetic layer comprises FeMn. The soft magnetic material may comprise "Permalloy" or like soft magnetic material. The individual magnetic layers are generally on the order of ten nanometers thickness, while the non-magnetic layer is approximately two nanometers thick. The structure and fabrication of GMR elements suitable for use with the invention are well known in the art, and are disclosed in further detail by C. Tsang et al. in IEEE Trans. Mag., MAG-30, p. 3910 (1994), the disclosure of which is incorporated herein by reference.

The outermost edge of GMk element 32 and the emission facet 34 of laser 28 preferably are co-planar with the air bearing surface 22 of the slider region 12. The individual layers or laminates in active region 38 preferably are not parallel to the recording medium (not shown) during readout, and are perpendicular to the direction of travel of the magnetic optical head 10 during readout operations. Preferably, a protective layer (not shown) of wear resistant, low friction material is included on air bearing surface 22 which also covers GMR element 32. The protective material may comprise, for example, of a metal nitride, metal carbide, metal, metal alloy, Group III nitride, Group IV nitride, Group III carbide, Group IV carbide, diamond, diamond-like carbon, hydrogenated carbon, fluoride, or fluoropolymer material. During operation, a lubricant layer (not shown) is preferably included on the protective layer.

A first conductor element 40 is included on the p-side 18 of substrate and is electrically connected to a p-sided electrical contact 42 (FIG. 4) for laser 28. P-side electrical contact 42 is of generally annular configuration and is positioned to surround the emission facet 34 of laser 28. P-side electrical contact 42 is generally located beneath or below magnetic coil 30 and one or more insulating layers associated with substrate 16. First conductor element 40 will also generally be located beneath one or more insulating layers of substrate 16 as related further below. For reasons of clarity, however, first conductor element 40 is shown in FIG. 1 and FIG. 4 with insulating layers omitted therefrom.

First conductor element 40 is also in electrical contact with a first conductive via 44 which extends through substrate 16 such that one end of via 44 communicates with the p-side 18 of substrate 16 while the other end of via 44 communicates with the n-side 20 of substrate 16. First conductive via 44 is in electrical connection with a first wire bonding pad 46 located proximate to the n-side 20 of substrate 16. Preferably, first wire bonding pad 46 is positioned on first insulating pad 48 as shown.

A second conductor element 50 is also included on the p-side 18 of substrate 16, and is electrically coupled to the outermost convolution 36 of magnetic coil 30. Second conductor element 50 is also in electrical connection with a second conductive via 52 which extends through substrate 16 from the p-side 18 to the n-side 20 thereof. Second conductive via 52 electrically connects with a second wire bonding pad 54 located on a second insulating pad 56 proximate n-side 20 of substrate 16.

Similarly, a third conductor element 58 on p-side 18 of substrate 16 electrically connects with the innermost convolution 37 of magnetic coil 30. A third conductive via 60 extends through substrate 16 to electrically connect with third conductor element 58 on p-side 18, and with a third wire bonding pad 62 positioned on a third insulating pad 64 on the n-side 20 of substrate 16.

A fourth conductor element 66 is provided on p-side 18 of substrate 16, and is electrically connected to a first terminal 68 of GMR element 32. Fourth conductor element 66 is also electrically connected to a fourth conductive via 70 which extends through substrate 16 to electrically connect to a fourth wire bonding pad 72 mounted on a fourth insulating pad 74 on the n-side 20 of substrate 16.

In a like manner, a fifth conductor element 76 is included on p-side 18 of substrate 16 which electrically connects with a second terminal 78 of GMR element 32. The fifth conductor element 76 is also electrically connected to a fifth conductive via 80 extending through substrate 16 to electrically connect with a fifth wire bonding pad 82 positioned on a fifth insulating pad 84 proximate to n-side 20 of substrate 15.

An n-side electrical contact 86 for laser 28 is also included on the n-side 20 of substrate 16 which, together with the p-side electrical contact 42, define a diode laser structure through the substrate 16, as related in more detail below.

Figure 6:
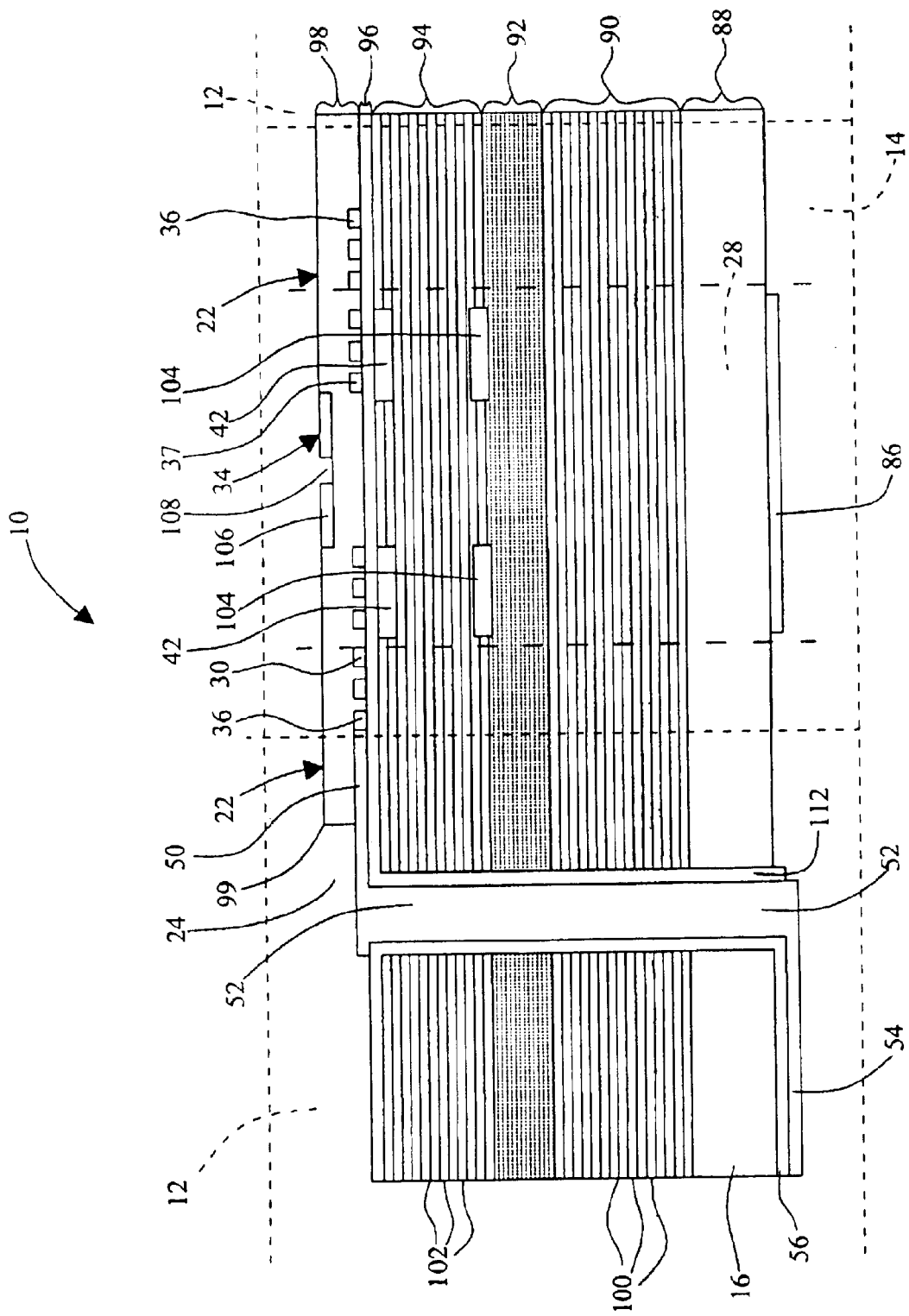
FIG. 6 is a side elevation view in cross-section of the magnetic-optical function region of FIG. 4 taken through line 6—6.
Figure 7:
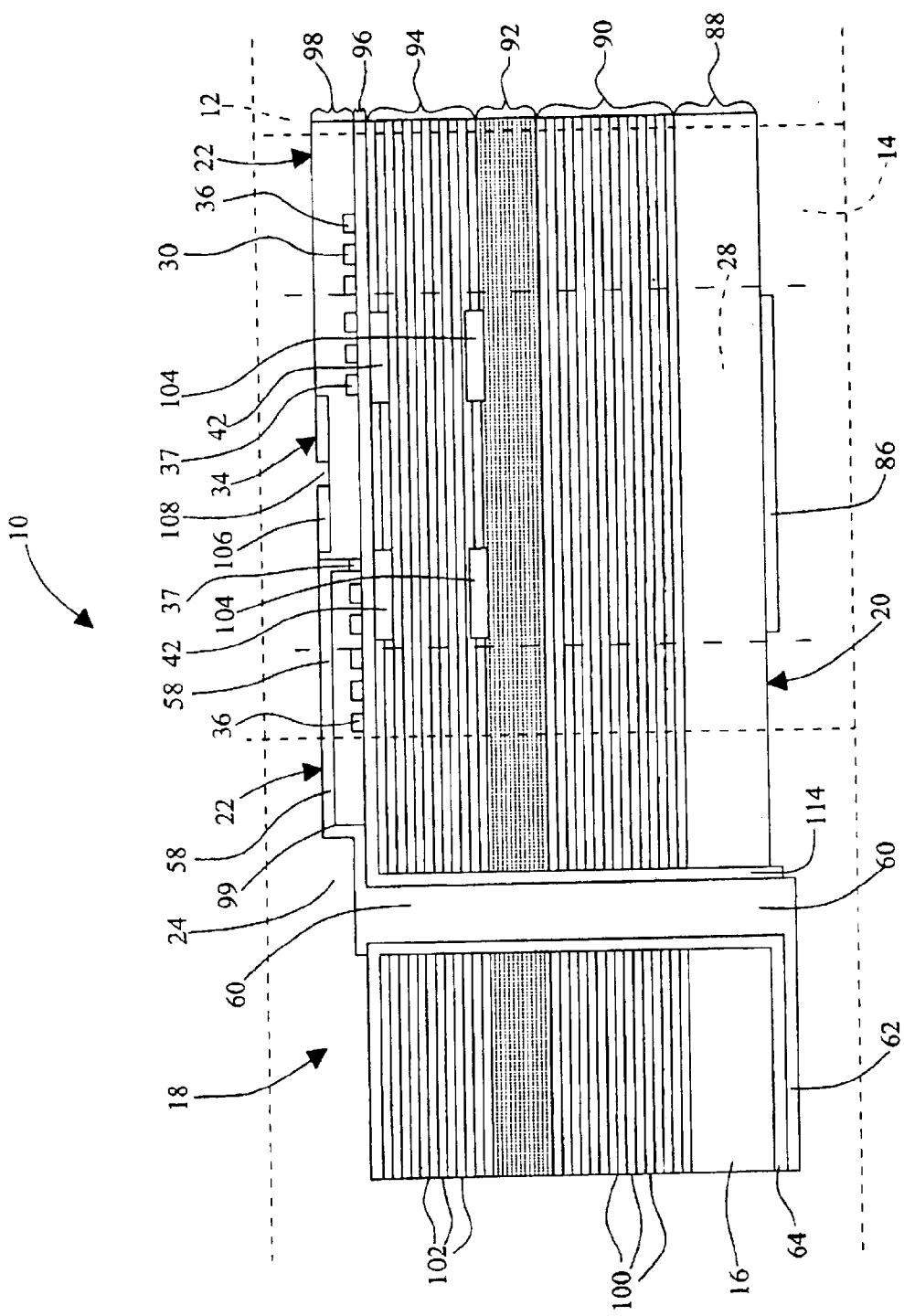
FIG. 7 is a side elevation view in cross-section of the magnetic-optical function region of FIG. 4 taken through line 7—7.

Referring now to FIG. 5 through FIG. 7, as well as FIG. 1 through FIG. 4, the semiconductor substrate 16 preferably comprises an n-doped base semiconductor layer 88, an n-doped lower mirror clad layer 90 adjacent n-semiconductor layer 88, an active region layer 92 adjacent n-clad layer 90, and an upper mirror p-doped clad layer 94 adjacent active region layer 92. Preferably, at least one insulating layer 96 is included adjacent to p-clad layer 94, and an outer metal outer insulating layer 98 is included on top of insulating layer 96. Insulating layers 96, 98 are each shown generally as a single layer, but may alternatively comprise additional or multiple layers of different insulating materials. The thickness of various layer components of substrate 16 are exaggerated for clarity, and it should be understood that the particular layer thicknesses and dimensions shown in FIG. 5 through FIG. 7 are merely illustrative and are not necessarily to scale.

The n-clad layer 90 preferably comprises a reflective set or stack of n-doped distributed Bragg reflector or DBR mirrors which, in the presently preferred embodiments, comprise a plurality of n-doped quarter wave ($\lambda/4$) layer pairs 100. The p-clad layer 94 preferably comprises a set or stack of p-doped distributed Bragg reflector or DBR mirrors in the form of p-doped quarter wave ($\lambda/4$) layer pairs 102. The number of mirror pairs 100, 102 will vary generally according to the desired emissive performance for laser 28, and the number of mirror pairs 100, 102 as shown is only exemplary. The active region layer 92 preferably includes a plurality of quantum well and quantum barrier structures (not shown). The active region layer 92, as positioned between reflective p-DBR stack 94 and reflective n-DBR stack 90, defines an optical cavity for laser 28, which operate as vertical cavity surface emitting laser or VCSEL.

Preferably, an annular-shaped oxide region 104 is formed in p-clad layer or stack 94. Oxide region 104 is formed by providing a plurality of oxidation channels or vias (not shown) which extend through p-clad 94 to the region of oxidation 104. The use of oxidation channels for forming oxide region 104 is preferred over lateral oxidation techniques which offer less control over the shape of oxide region 104. The use of such channels to form an oxide region in this manner is known in the art and is described more fully in U.S. Pat. No. 5,978,408, the disclosure of which is incorporated herein by reference. The annular-shaped oxide region 104, together with annular shaped p-side electrical contact 42 and n-side electrical contact 86, generally define the shape and optical mode of laser 28.

In the preferred embodiments, the outer surface of insulating layer 98 proximate emission facet 34 of laser 28 may be etched to accommodate deposition of a metal layer 106 thereon. Metal layer 106 may then itself be etched to form a small aperture 108 in emission facet 34. The use of a small aperture 108 in emission facet 34 provides for near-field operation of the invention. Metal layer 106, instead of being confined to emission facet 34, alternatively may be configured to substantially cover insulating layer 98 such that air bearing surface 22 is defined by the outer surface of the metal layer rather than insulating layer 98.

In the presently preferred embodiments, the materials of substrate 16 are based on GaAs and AlGaAs. Thus, n-semiconductor base or substrate layer 88 may comprise n-GaAs. The n-DBR stack 90 may comprise, for example, a plurality of n-$Al_{0.16}Ga_{0.84}As$/n-$Al_{0.96}Ga_{0.04}As$ quarter wave dielectric pairs 100, and p-DBR stack 94 may comprise a plurality of p-$Al_{0.16}Ga_{0.84}As$/p-$Al_{0.96}Ga_{0.04}As$ quarter wave dielectric pairs 102. Insulating layers 96, 98 may comprise $SiO_2$, other insulating metal oxide, or undoped GaAs. These particular materials and ratios are exemplary and will necessarily vary according to the particular features and characteristics required of laser 16, as is known in the art. Other semiconductor materials suitable for use with the invention include, for example and without limitation, AlGaInP, InGaAs, AlGaInN, InGaAsN, InGaAsP and InP. The p-DBR stack 92 may selectively be ion-implanted in the slider region 12 of head 10.

Substrate 16 may be formed via a variety of conventional low-cost, high volume semiconductor fabrication techniques, including using metal organic vapor phase epitaxy (MOVPE), liquid phase epitaxy (LPE), molecular beam epitaxy (MBE), and the like. Generally, n-semiconductor base layer 88 is used as a substrate, with n-DBR stack 90 formed or deposited thereon, with active region layer 92 deposited on n-DBR stack 90, and with p-DBR stack 94 deposited onto active region layer 92. The number and location of insulating layers deposited on top of p-DBR stack 94 will generally depend upon the particular arrangement of conductive elements 40, 50, 58, 66 and 76, and the depth location of laser p-electrical contact 42, as described further below.

The outermost insulating layer 98 is either selectively deposited on insulating layer 96, or is selectively removed from insulating layer 96, such that an aerodynamically shaped air flow cavity 24 is defined on the p-surface 18 of semiconductor substrate 16, with an air bearing surface 22 being provided by the outermost surface of insulating layer 98. The structure, configuration and depth of cavity 24 will generally vary according to the particular use of the magnetic-optical head 10. The depth of air cavity 24 with respect to the various layers of substrate 16 is not necessarily shown to scale, and it should be readily understood by those skilled in the art that air cavity 24 may extend deeper into substrate 16 than is shown. For clarity, the boundary between air bearing surface 22 and air cavity 24 is shown generally by a step or shoulder 99 in the outermost insulating layer 98 on substrate 16.

Referring particularly to. FIG. 5, first conductive element 40 and annular-shaped laser p-electrical contact 42 preferably are interposed between p-clad layer 94 and insulating layer 96. In this regard, p-clad layer 94 may be suitably patterned and etched to form a recessed area configured to accommodate conductor element 40 and p-electrical contact 42, with metal subsequently deposited in the recessed area to: form conductor element 40 and p-electrical contact 42 as shown, with conductor element 40 and p-electrical contact 42 being flush with the top surface of p-clad layer 94 and in electrical contact therewith. Insulating layer 96 is then deposited on top of p-clad layer 94, conductor element 40 and p-electrical contact 42 as shown so that insulating layer 96 is generally smooth or flat. Insulating layer 96, which may comprise conventional oxide, nitride, or other insulating material, serves to electrically insulate conductor 40 and p-electrical contact 42 from magnetic coil 30, which is subsequently deposited on insulating layer 96 as related further below.

In other embodiments of the invention, conductor 40 and p-electrical contact 42 may be deposited directly upon the top surface of p-clad layer 94 without prior patterning thereof. In such an arrangement, conductor 40 and p-electrical contact 42 would lie on top of p-clad layer, and the overlying insulating layer may be etched to accommodate p-side contact 42 and conductor element 40. Alternatively, an insulating layer may be deposited directly on top of the p-side contact 42 and conductor element 40 such that the p-side contact 42 and conductor element 40 impart some surface topography to the overlying insulating layer 96, in which case additional planarization layers of insulating material may be used to smooth the insulating surface prior to deposition of magnetic coil 30. The use of planarization layers in connection with p-side contact 42 are described in U.S. patent application Ser. No. 09/495,552, U.S. patent application Ser. No. 09/495,557, U.S. patent application Ser. No. 09/495,558, and U.S. patent application Ser. No. 09/495,636, each filed on Feb. 1, 2000 in the names of Thornton et al., the disclosures of which are incorporated herein by reference.

It is desirable that air bearing surface 24 and emission facet 34 of laser 28 remain the uppermost or "highest" features associated with the p-surface 18 of substrate 16, to ensure the aerodynamic properties of slider 14 and magnetic-optical head 10. Thus, electrical connection with p-contact 42 is preferably achieved through wire bonding pads which are located on a surface or portion of substrate 16 other than the p-surface 18, or which is are otherwise remote from p-surface 18 and air bearing surface 22. In this regard, the invention advantageously utilizes conductive channel or via 44, which extends through substrate 16 and communicates with both the p-surface 10 and n-surface 20 of substrate 20, as noted above. Conductive via 44 electrically connects conductor 40 and p-contact 42 with a metal wire bonding pad 46 located on the n-side 20 of substrate 16. In this manner, electrical connection to both n- and p-side electrical contacts 42, 68 of laser 28 can be achieved from the n-side 20 of substrate 16 and away from air. bearing surface 24, thereby preserving the aerodynamic features on the p-side 18 of substrate, 16. Preferably, conductive via 44 is enclosed or surrounded by an insulating layer 110. An insulating oxide or nitride pad or layer 48 is preferably positioned between wire bonding pad 46 and n-semiconductor layer 88.

Various VCSEL laser structures known in the art may be used for laser 28, with a small aperture emission facet configuration being preferred for near-field applications. Generally, the upper p-DBR mirror stack or clad layer 94 presents the dominant loss for laser 28, and represents the path through which output power of laser 28 is extracted. The number of dielectric layer pairs 100, 102 in DBR mirror stacks 90, 94 may be varied as required to control the optical power which is extracted from emission facet 34. Metal layer 106 preferably comprises a highly reflective metal such as Ag or Au, such that the reflectivity of metal layer 106 on emission face 34 acts together with p-DBR mirror stack 94. Preferably aperture 108 extends through reflective metal surface layer 106. The emission facet 34 thus presents two regions of differing reflectivities. The region of laser 28 surrounding the aperture 108 has a higher reflectivity due to the presence of the reflective metal layer 106. The region of laser 28 under aperture 108 has a lower reflectivity due to the absence of the reflective metal layer 106 at the aperture 108. For an aperture 108 of a particular or given area, the depth of the aperture 108 can be selected and adjusted such that a particular target loss can be achieved for laser 28. The use of an aperture 108 in emission facet 34 allows the majority of the optical output from emission facet 34 to be directed through aperture 108, thus providing a relatively small laser mode spot for near-field optical reading and writing applications. Some presently preferred small aperture VCSEL structures suitable for use, with the invention are disclosed in Provisional Patent Application Ser. No. 60/151,492, filed on Aug. 30, 1999 in the name of Robert L. Thornton, the disclosure of which is incorporated herein by reference.

The electrical connections associated with magnetic coil 30 will be more fully understood by reference to FIG. 6 and FIG. 7. As in the case of p-electrical contact 42, electrical connection with the inner and outer terminals 36, 37 of magnetic coil 30 is preferably achieved through wire bonding pads which are located on a surface or portion of substrate 16 other than the p-surface 18, or which is are otherwise remote from p-surface 18 and air bearing surface 22. In FIG. 6, conductive element 50, which electrically connects the outer terminal or convolution 36 of magnetic coil 30 to conductive via 52, and hence to n-side wire bonding pad 54, is shown as positioned between insulating layer 96 and outermost insulating layer 98. In FIG. 7, conductive element 58, which electrically connects the inner terminal or convolution 36 of coil 30 to conductive via 60 and hence to n-side wire bonding pad 62, is positioned on top of outermost insulating layer 98. Conductive vias 52, 60 respectively are surrounded by insulating layers 112 and 114, and wire bonding pads 54, 62 are respectively positioned on insulating pads 56, 64. In this manner, each terminal 36, 37 of magnetic coil 30 is electrically connected to its corresponding wire-bonding pads 54, 62 by means of suitably insulated conductors 50, 58 and vias 52, 60. Further, conductive elements 56, 64 as shown do not extend above air bearing surface 22, and the aerodynamic integrity of the magnetic-optical head 10 is preserved. In this regard, outermost insulating layer 98 is preferably etched to form a recess which accommodates conductive element 58, so that the top surface of conductive element 58 is generally flush or contiguous with air bearing surface 22, as shown in FIG. 7, and also such that conductive element 58 electrically contacts the inner terminal or convolution 37 of coil 30 and conforms to the shape imparted by shoulder 99. A gap or region of insulation is maintained between conductive element 58 and metal layer 106 on laser emission facet 34.

The particular arrangement of conductive elements 50, 58 as shown in FIG. 6 and FIG. 7 represent only one presently preferred embodiment of the invention. For example, it is contemplated that conductor element 50, which connects to outer terminal 36 of coil, may be positioned above, rather than below insulating layer 98, while the conductor element 58 coupled to inner terminal 37 may be positioned below, rather than above insulating layer 98. Most importantly, the conductive elements 50, 58, as well as conductive elements 40, 66, 76, should be suitably insulated with respect to each other and positioned such that the air bearing surface 22 is at least as high as, or higher than, the top surfaces of the conductive elements, so that the aerodynamic properties associated with the air bearing surface (and air flow cavity 24) are maintained. Various other suitable arrangements of conductors will suggest themselves to those skilled in the art, and are also considered to be within the scope of this disclosure.

Referring again to FIG. 1 and FIG. 4, the conductor elements 66, 76 associated with GMR sensor 32 preferably are structured, configured and positioned with respect to outer insulating layer 98 in generally the same manner as is shown for conductor element 58 in FIG. 7. That is, insulating layer 98 is suitably patterned or etched to form recesses such that the metal for conductor elements 66, 76 may be deposited thereon in the recesses, so that the outermost surfaces of conductor elements 66, 76 are generally flush or contiguous with air bearing surface 22. Alternatively, conductive elements may be positioned beneath insulating layer 98 and above insulating layer 96 as shown in FIG. 6 for conductive element 50. Conductive elements 66, 76 respectively are electrically connected to terminals or contacts 68, 78 on GMR sensor 32. Conductive elements 66, 76 also are respectively coupled to conductive vias 70, 80, and hence to wire bonding pads 72, 82 on the n-side 20 of substrate. Conductive vias 70, 80 are surrounded by a layer of insulation (not shown) which insulates vias 70, 80 from the interior of substrate 16 in the same manner provided by insulator layer 114 for via 60 in FIG. 7.

The present invention also provides a method for preparing a magnetic-optical head which comprises, in general terms, preparing a single, monolithic semiconductor substrate 16, forming or defining at least one magnetic-optical function region 14 on the semiconductor substrate 16, and forming or defining an aerodynamic slider region 12 on the semiconductor substrate 16.

More preferably, the preparing of the semiconductor substrate 16 comprises providing a base layer 88 of n-semiconductor material, depositing an n-clad layer 90 thereon, depositing an active region layer 92 on the n-clad layer 90, depositing a p-clad layer 94 on the active layer, and depositing at least one insulating layer 96 on the p-clad layer 94. The semiconductor substrate 16 is preferably formed via conventional low-cost, high volume semiconductor fabrication methods as noted above. The n-clad layer 90 and p-clad layer 94 preferably comprise an n-DBR mirror stack and a p-DBR-mirror stack, as noted above.

The forming or defining of the magnetic-optical function region 14 preferably comprises forming a laser 28 in association with substrate 16, forming a magnetic field biasing element on the p-side 18 of substrate proximate to the laser 28, and forming a magnetic sensor element 32 on the p-side 18 of substrate 16. The forming or defining of laser 28 comprises depositing a p-side electrical contact 42 on the p-clad layer 94 and an n-side electrical contact 86 on the n-semiconductor layer 88 to define a diode laser structure 28 across substrate 16. The forming or defining of the magnetic field biasing element comprises depositing a conductive coil on the p-side 18 of substrate 16. The forming or defining of the magnetic sensing element preferably comprises depositing a GMR sensor 32 on the p-side 18 of substrate 16.

The forming or defining of the magnetic-optical function region 14 will also preferably comprise forming a plurality of conductor elements 40, 50, 58, 66, 76 on the p-side 18 of substrate 16 which are in electrical contact with the laser p-side contact 42, outer terminal 36 of magnetic coil 30, inner terminal 37 of magnetic coil 30, and the terminals 68, 78 of GMR sensor 32, forming a plurality of conductive vias 44, 50, 60, 70, 80 which extend through substrate 16 to communicate with the p-side 18 and n-side 20 thereof and electrically connect with conductor elements 40, 50, 58, 66, 76, and forming a plurality of n-side wire-bonding pads 46, 54, 62, 72, 82 which connect to corresponding conductive vias 44, 50, 60, 70, 80. Preferably, the defining of the laser 28 in the magnetic-optical function region 14 also comprises depositing a metal layer 106 on the emission facet 108 of laser 28, and etching or cutting an aperture 108 in the metal layer 106. Forming of the laser 28 also preferably comprises creation of an oxide region 104 within the p-clad layer 90 of substrate 16 to define an optical mode for laser 28.

The forming or defining of the slider region 12 is carried out by selectively forming an outermost insulating layer 98 on the p-side 18 of substrate 16 to create an air flow cavity 24, with the outer surface of the outermost insulating layer 98 providing an air bearing surface 22 for the slider region 12. The forming of the outermost insulating layer 98 may comprise selective deposition of insulating layer 98 onto p-surface 18 such that air flow cavity 24 is formed, or by depositing insulating layer 98 over all of p-surface 18 and then selectively etching away the insulating layer 98 to define an air flow cavity 24, with the outermost surface of the un-etched portion defining the air-bearing surface 22. The air bearing surface 22 is configured such that it is substantially co-planar with the emission facet 34 of the diode laser 28 defined in the magnetic-optical function region. The material of the air bearing surface 22 and the outermost layer on the emission facet 34 may comprise the same insulator material layer or, more preferably, a metal layer 106 is provided on emission facet 34 as described above.

One preferred method of fabrication of the hybrid magnetic-optical head 10 in accordance with the invention is illustrated schematically in FIG. 8A through FIG. 8I and FIG. 9A through FIG. 9I, wherein like reference numbers are used to denote like parts. It should be understood by those skilled in the art that the particular order and details of events as shown in FIG. 8 and FIG. 9 may be varied from those described herein. Various other similar fabrication methods will suggest themselves to those skilled in the art. The detail of the dielectric mirror pairs in n-stack 90 and p-stack 94 have been omitted, and the relative sizes and thicknesses of various material layers and parts in FIG. 8 and FIG. 9 have been exaggerated for clarity.

Figure 8A:
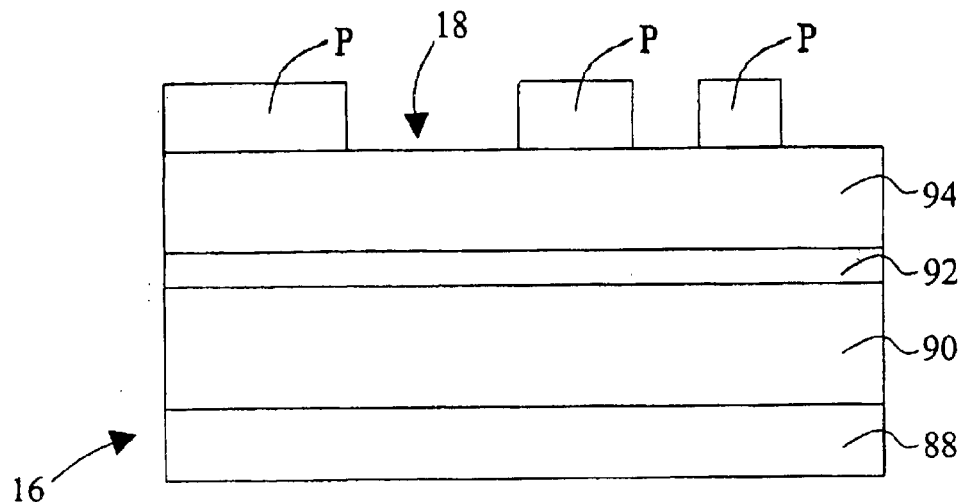
FIG. 8A through FIG. 8I schematically illustrate fabrication steps for one preferred method of forming laser electrical contacts and a conductive via for the magnetic-optical head of FIG. 1, with the semiconductor substrate shown schematically in side elevation cross-section.

Referring first to FIG. 8A, semiconductor substrate 16 is initially formed with n-semiconductor layer 88, n-DBR stack 90, active region layer 92, and n-DBR stack 94. Photoresist P is then deposited on the p-surface 18 of substrate 16 via conventional spin coating or like technique, and the photoresist P is then patterned and developed according to the configuration of the laser p-side electrical contact 42 and associated conductor element 40 (see FIG. 5). Patterning of photoresist P may be carried out via conventional lithographic techniques, and photoresist P may be of either positive or negative tone and developable by conventional methods.

Figure 8B:
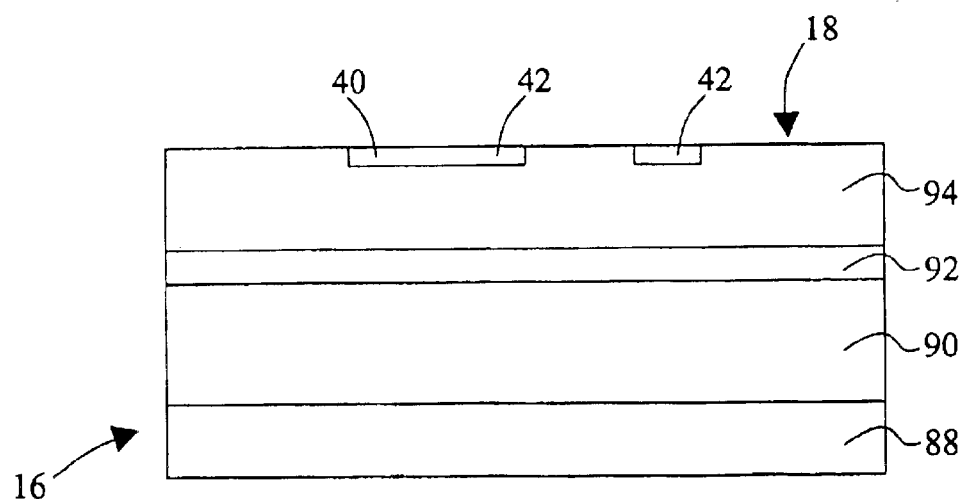

Referring also to FIG. 8B. Once photoresist P has been suitably patterned, the p-surface 18 is etched to a depth suitable to accommodate p-side electrical contact 42 and conductor element 40, and metal is deposited in the etched regions to form p-side electrical contact 42 and conductor element 40. With p-contact 42 in electrical contact with p-DBR stack 94. Photoresist P is then stripped from p-surface 18. Laser p-side electrical contact is annular in shape and defines generally the laser optical mode and emission facet shape, as related above.

Figure 8C:
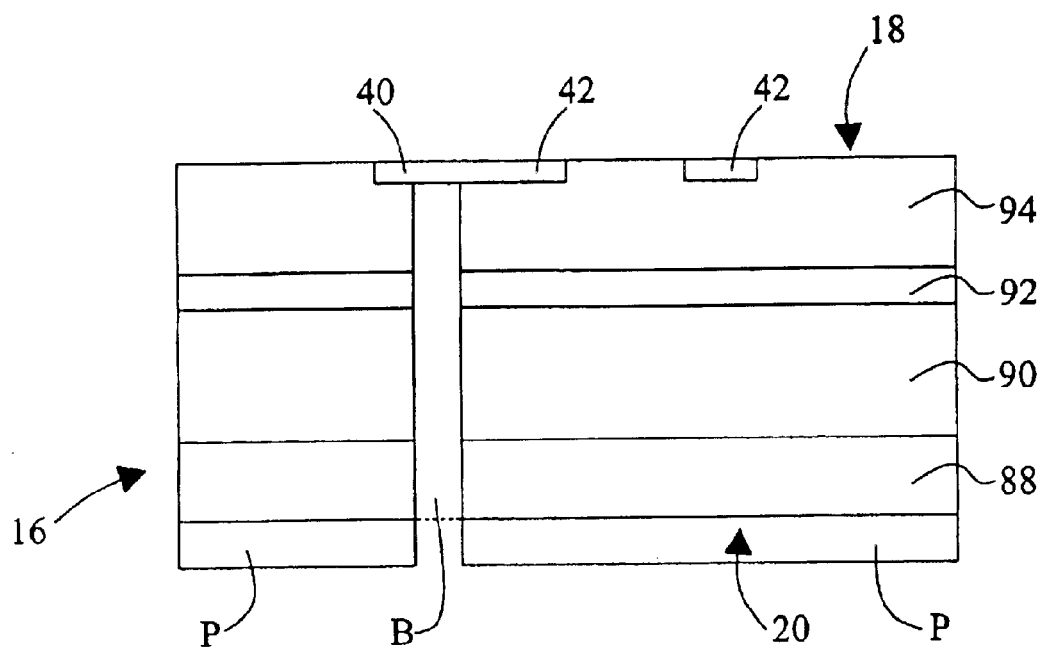
Figure 8D:
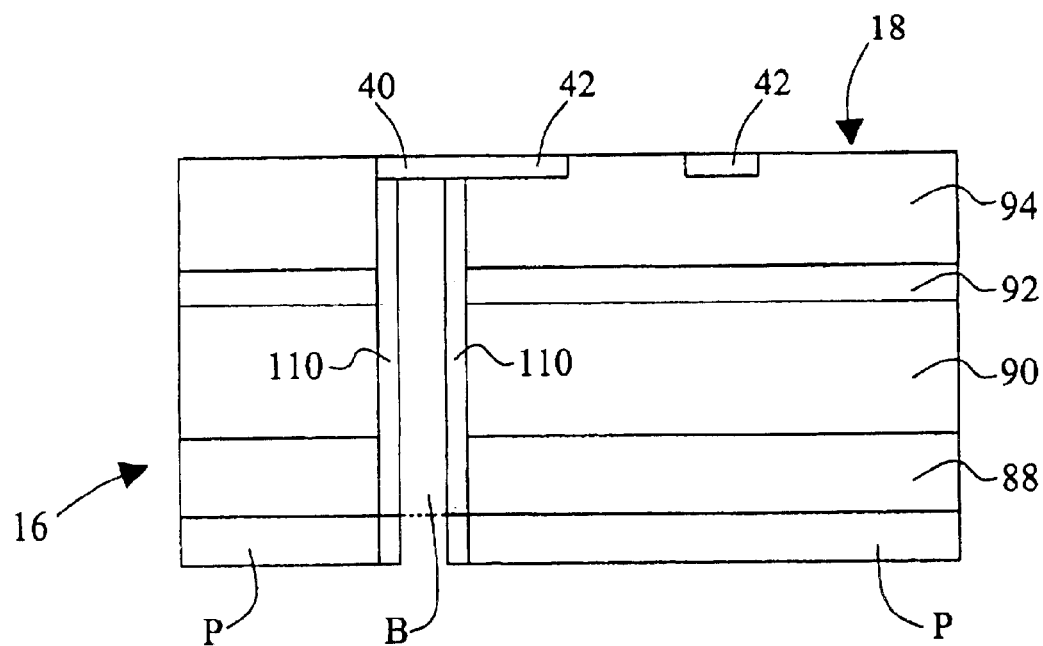
Figure 8E:
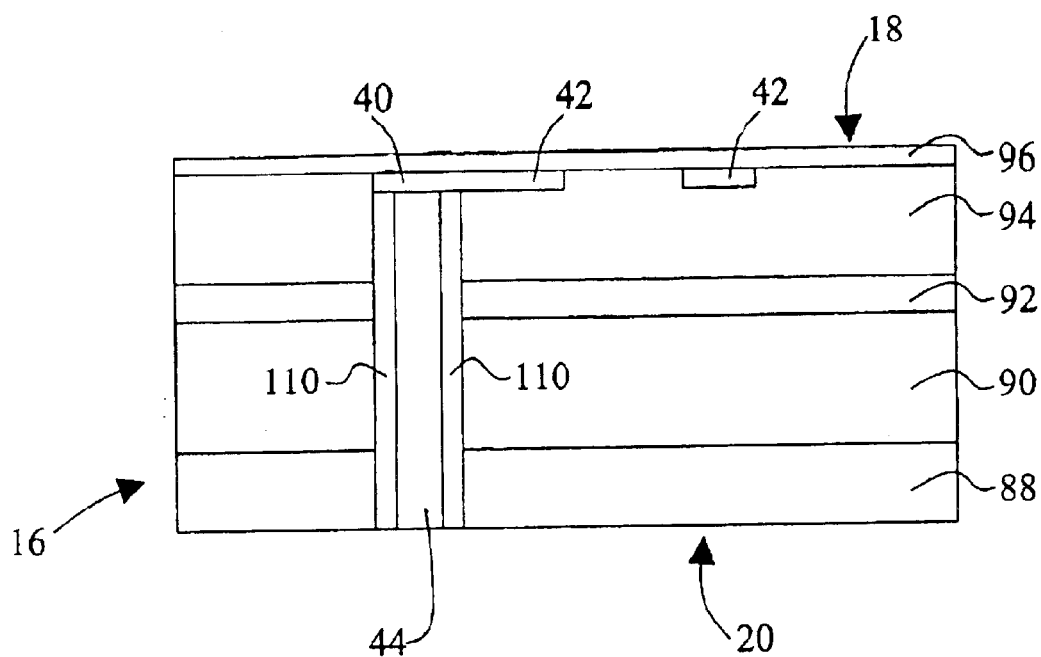
Figure 8F:
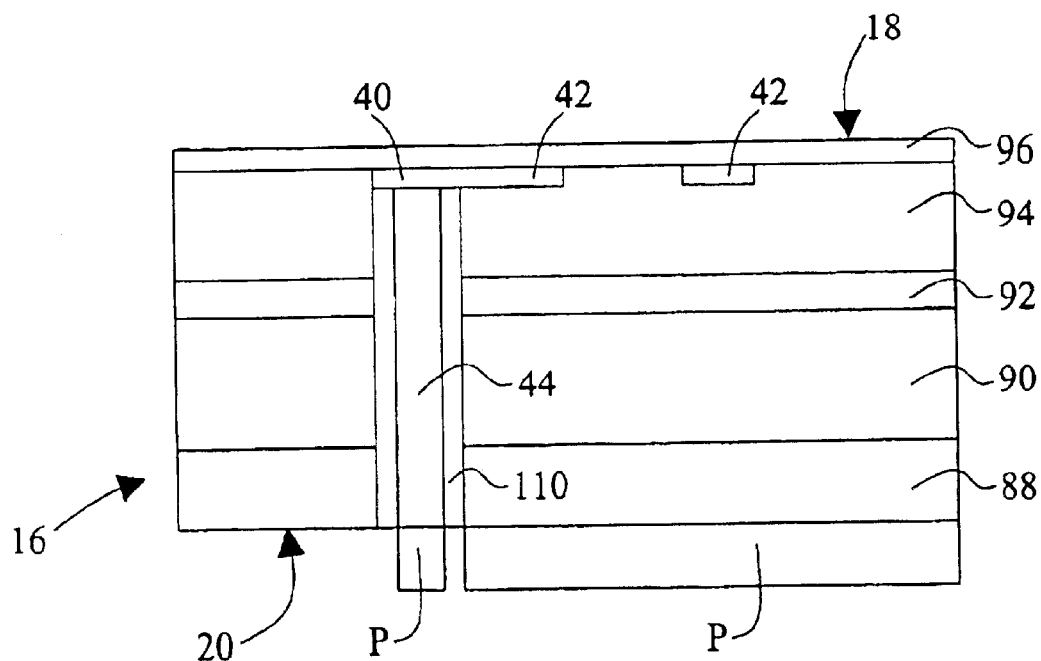

Photoresist P is then applied to n-surface 20 of substrate and is patterned and developed, as shown in FIG. 8C, according to the dimensions of conductive via 44 (FIG. 5). Once the photoresist is patterned and developed, an anisotropic etching technique, such as plasma etching or reactive ion etching, is used to form a channel or bore B through substrate 16 to conductor element 40. Referring also to FIG. 8D, an insulating dielectric layer 110 is formed along the interior of bore B by lateral oxidation, sputter deposition, CVD, nitride formation, or other technique. Following the formation of dielectric layer 110, metal is deposited within bore B to form conductive via 44, which electrically contacts conductor element 40, as shown in FIG. 8E. Photoresist P is then stripped from n-surface 20. At this point, a dielectric layer 96 may be deposited on p-surface 18 as shown in FIG. 8E. Dielectric layer 96 may alternatively be formed in an earlier or later event in the fabrication process.

Figure 8G:
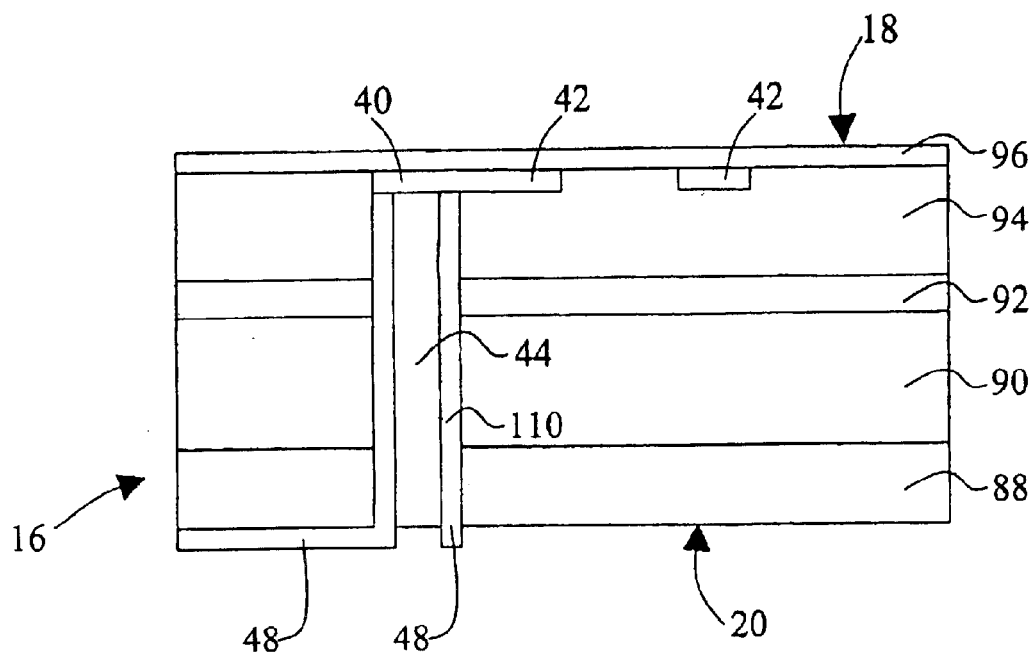
Figure 8H:
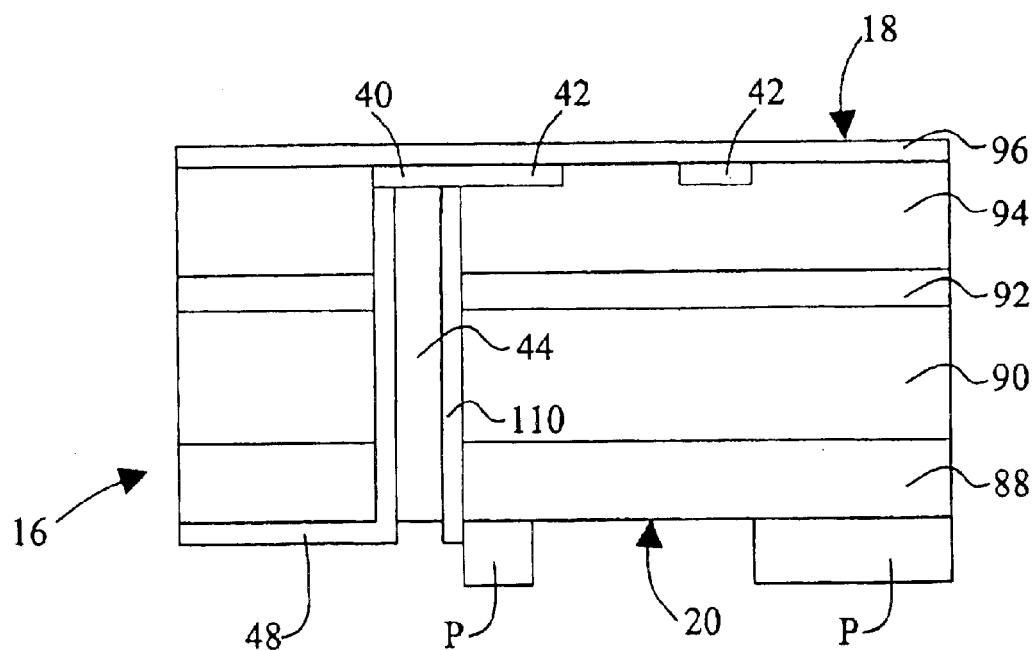

Referring next to FIG. 8F, photoresist P is again coated on n-surface 20 and is patterned and developed according to the shape of insulator pad 48 (FIG. 5). A dielectric layer of oxide, nitride, or like insulating material is then deposited on n-surface 20 according to the pattern of photoresist P to form insulator pad 48, after which photoresist P is stripped from n-surface 20, as shown in FIG. 8G.

Figure 8I:
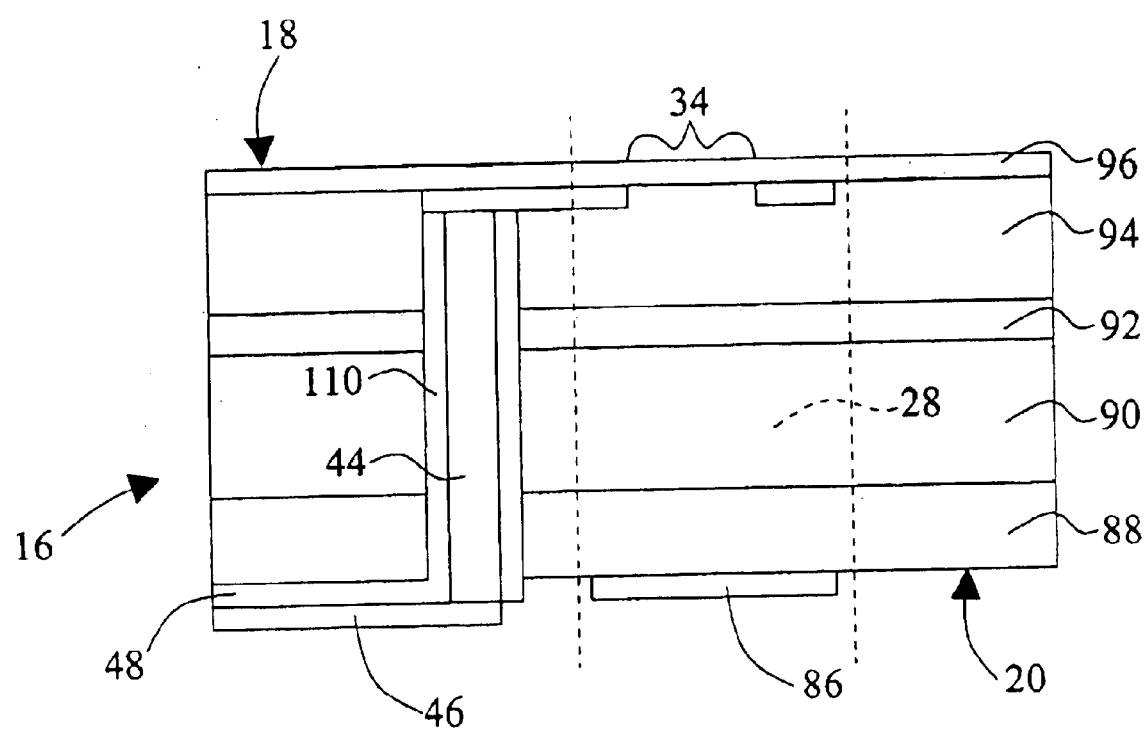

In FIG. 8H, photoresist P is again coated on n-surface 20 and is patterned and developed according to the structure and configuration of wire bonding pad 46 and laser n-side contact 86 (FIG. 5). Metal is then deposited on n-surface 20, and photoresist P is stripped to provide wire bonding pad 46 and n-side electrical contact 86, as shown in FIG. 8I. Wire bonding pad 46 is insulated from substrate by dielectric pad 48, while n-side contact 86 is in electrical contact with the layer 88 of n-semiconductor material. The p-side 42 and n-side 86 contacts define generally the diode structure of laser 28 across substrate 16, while the annular shape of p-contact 42 defines generally the emission facet 34 of laser 28, as shown in FIG. 8I. Formation of oxide regions 104 (FIG. 5) in the described in U.S. Pat. No. 5,978,408, as related above, to define the optical mode of laser 28. For reasons of clarity, oxide regions 104 are omitted from FIG. 8 and FIG. 9.

Referring now to FIG. 9A through FIG. 9I, the fabrication of the magnetic field biasing element of the magnetic-optical function region is shown schematically, with like reference numbers being used to denote like parts. Once again, it should be readily understood that the particular fabrication details as described herein are merely exemplary. Several variations to the process will suggest themselves to those skilled in the art upon review of this disclosure, and are also considered to be within the scope of the disclosure.

Figure 9A:
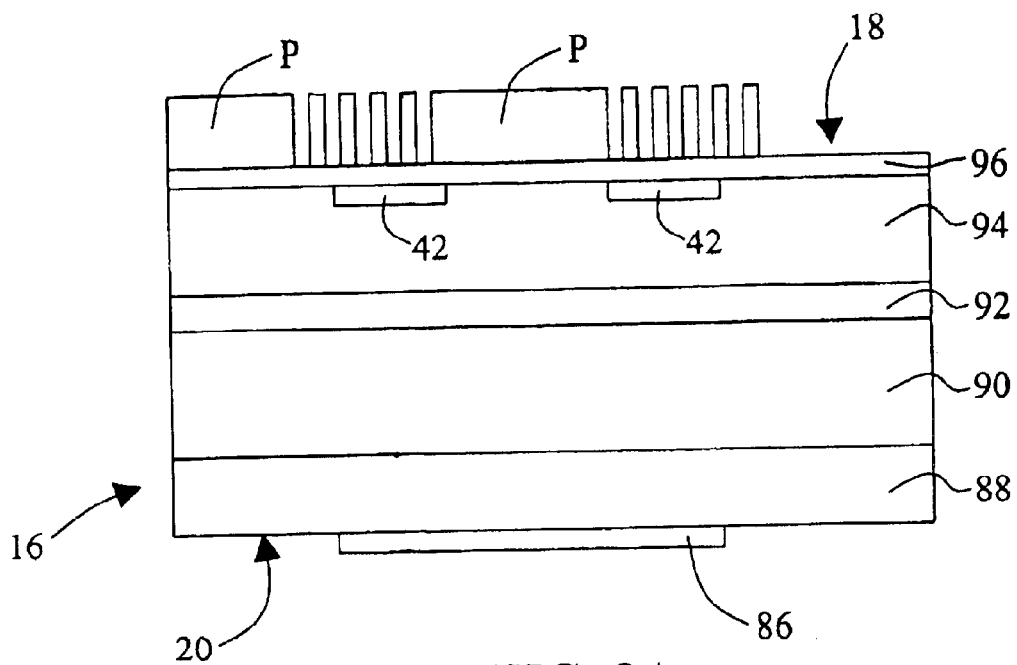
FIG. 9A through FIG. 9I schematically illustrate fabrication steps for one preferred method of forming the magnetic field biasing element and small aperture laser emission facet of the magnetic-optical head of FIG. 1, with the semiconductor substrate shown schematically in front elevation cross-section.

The substrate 16 as shown in FIG. 9A is generally the same as shown in FIG. 8I, with FIG. 9A providing a front elevation cross-sectional schematic view of substrate 16, while FIG. 8I provides a side elevation cross-sectional schematic view of substrate 16. As shown in FIG. 9A, a photoresist P is deposited on dielectric layer 96 at the p-surface 18 of substrate 16, and the photoresist is patterned and developed according to the structure and configuration of magnetic coil 30 and conductive element 50 (FIG. 6).

Figure 9B:
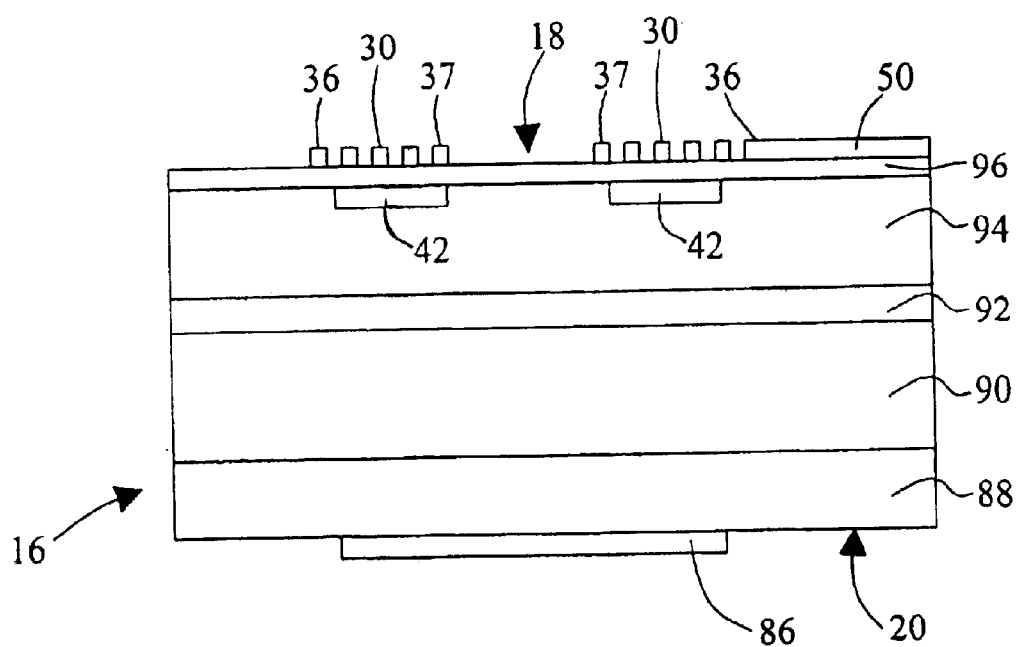

Metal is then deposited on p-surface 18, and the photoresist P is stripped therefrom, to provide magnetic coil 30 and conductive element 50, as shown in FIG. 9B. Magnetic coil includes a plurality of convolutions, including an outermost convolution 36 and an innermost convolution 37. As shown, conductive element 50 is electrically coupled to the outermost convolution 36 of coil 30. The conductive via 52. (FIG. 6) may at this point be formed in the manner described above for via 50. That is, a photoresist is deposited on n-surface 20 and suitably patterned and developed, followed by anisotropic etching to form a bore through substrate 16 to conductor 50, lateral formation of dielectric within the bore, and deposition of metal within the bore to form the conductive via. For reasons of clarity, conductive via 52 has been omitted from FIG. 9A through FIG. 9H.

Figure 9C:
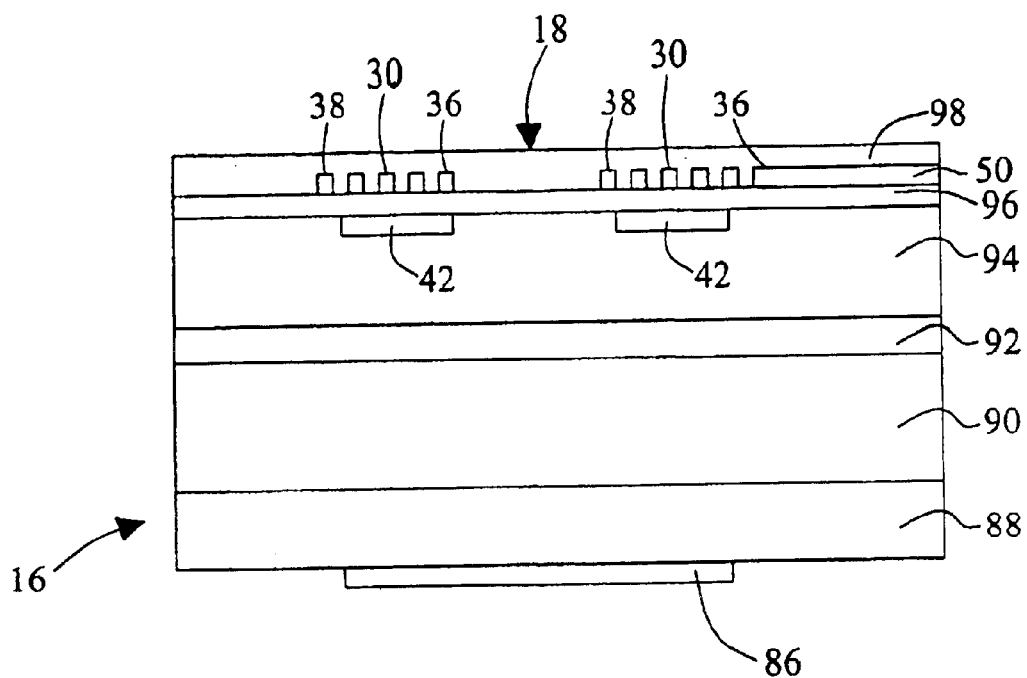
Figure 9D:
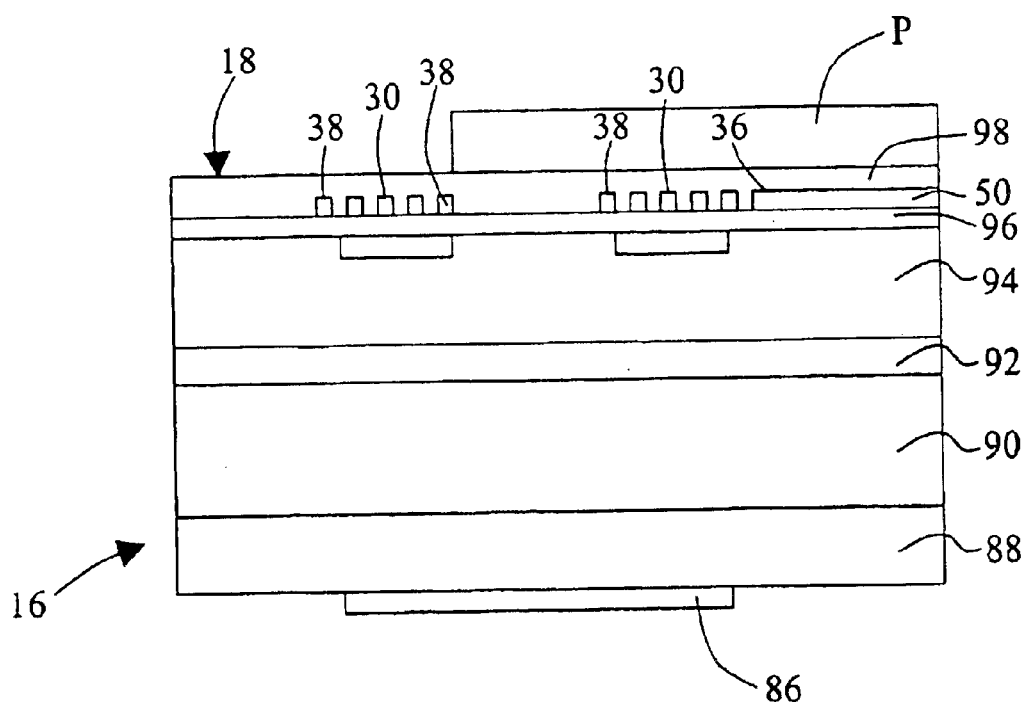
Figure 9E:
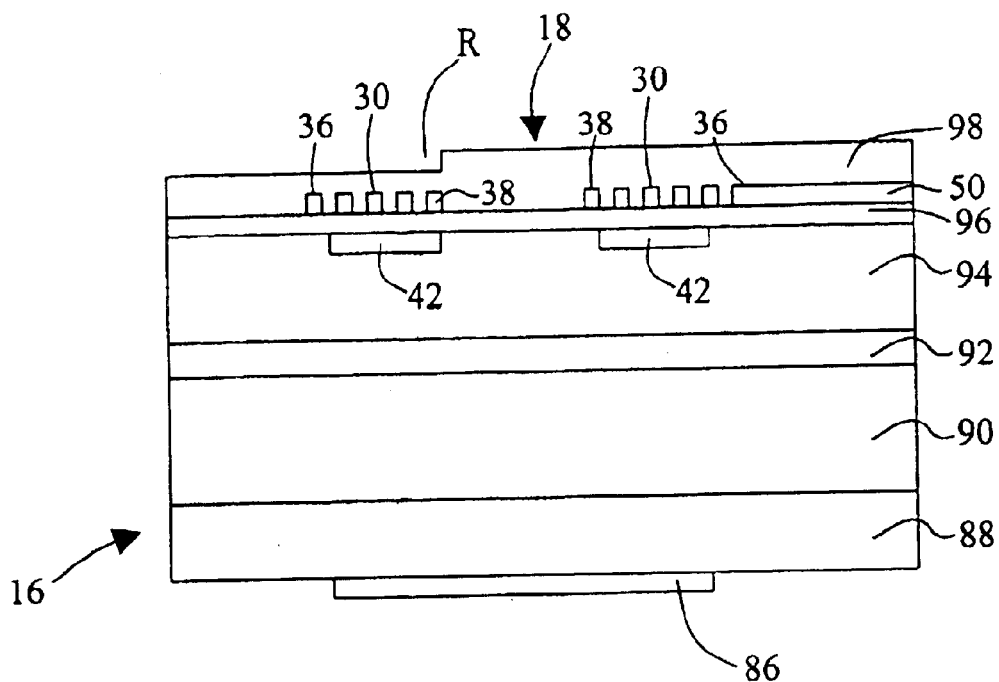
Figure 9F:
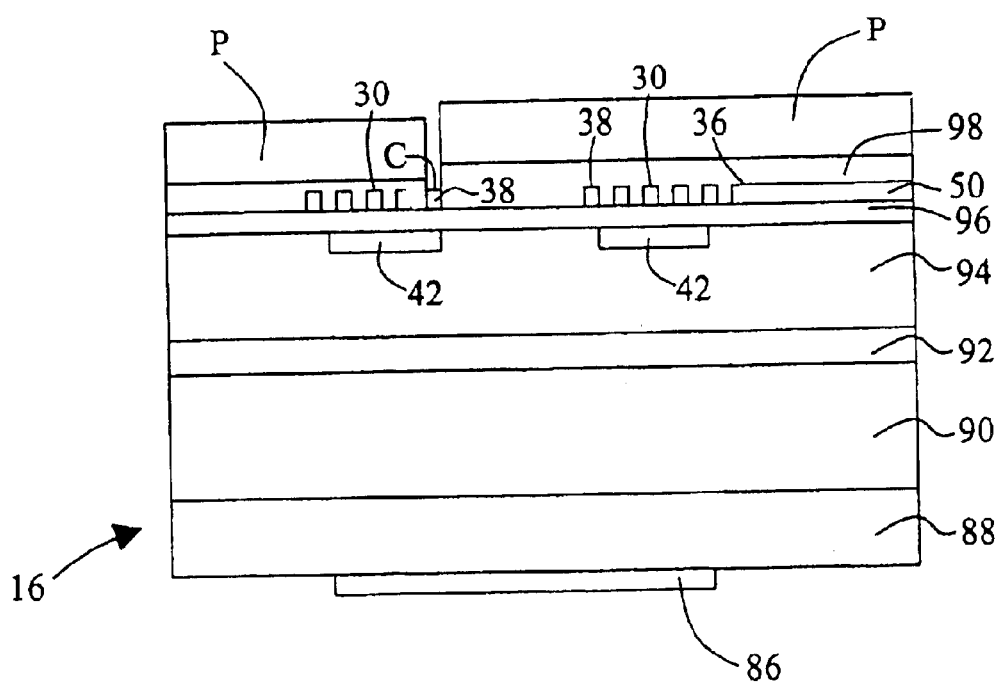
Figure 9G:
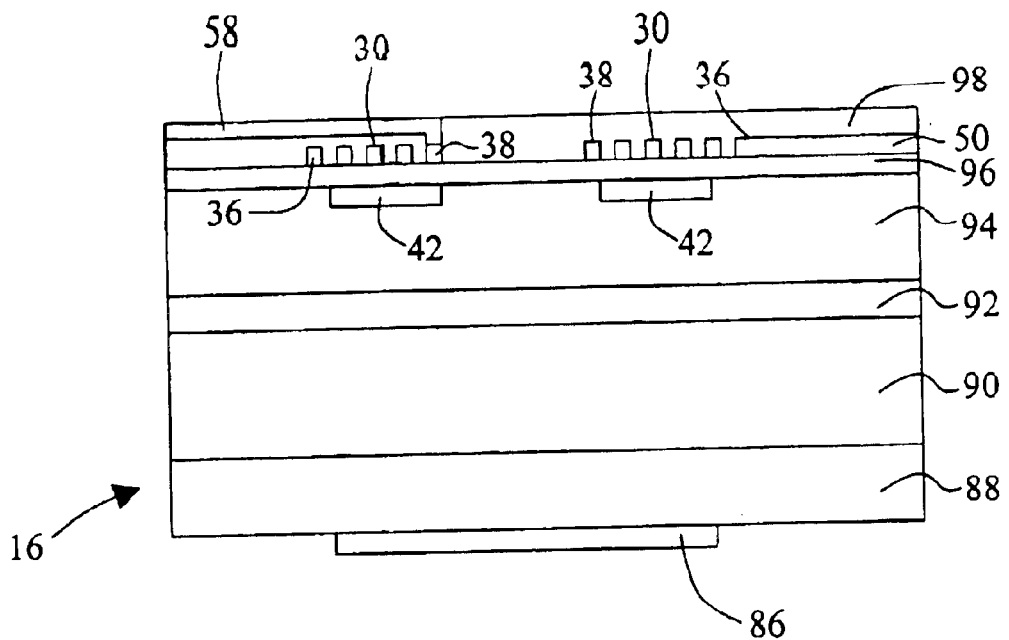
Figure 9H:
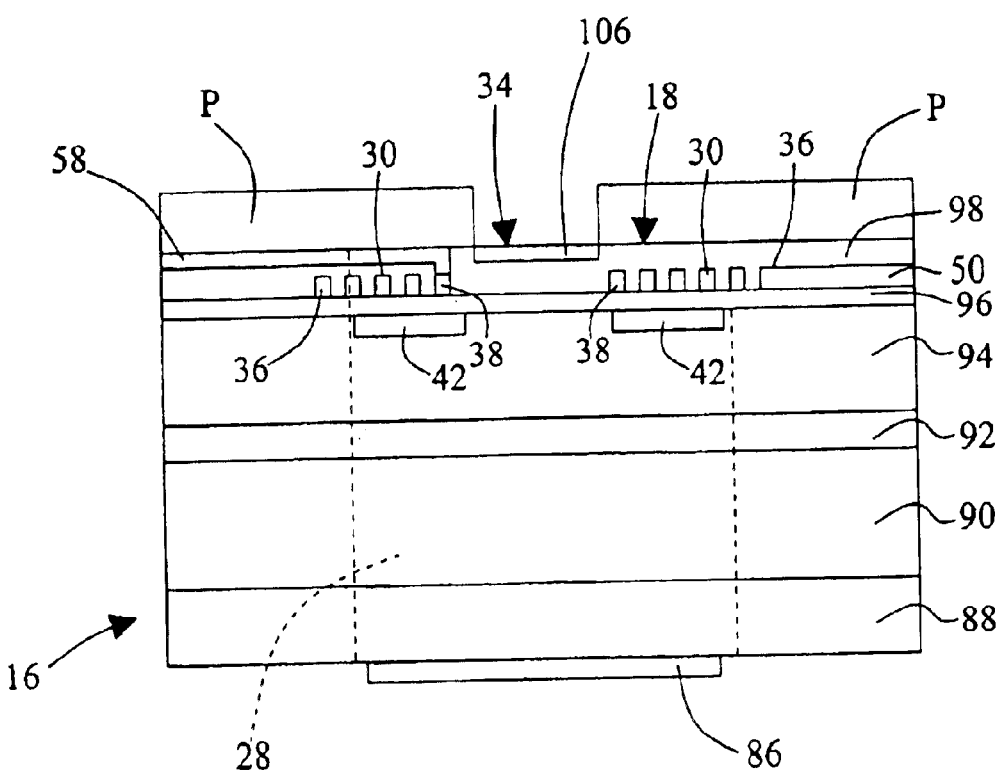

Following the formation of magnetic coil 30 and conductive element 50, a dielectric layer 98 is formed on p-surface 18 which covers coil 30 and conductive element 50, as shown in FIG. 9C. The shape of coil 30 and conductor 50, which underlie dielectric layer 98, may impart some surface topography (not shown) to layer 98, which may be reduced or eliminated by deposition of additional insulating planarization layers (not shown). Photoresist P is then coated on p-surface 18, as shown in FIG. 9D, and is patterned and developed according to the structure and configuration of conductive element 58 (FIG. 7). P-surface 18 is then etched, and the photoresist P stripped, to provide a recess R which is structured and configured for the conductive element, as shown in FIG. 9E. Photoresist P is again applied to p-surface 18, and is patterned and developed as shown in FIG. 9F, followed by etching to define a channel C which will ultimately connect conductor 58 to inner convolution 37 of coil 30. Metal is then deposited on p-surface 18, and the photoresist is stripped to provide conductor element 58 as shown in FIG. 9G, which is in electrical connection with inner convolution 37 of magnetic coil 30. The conductive via 60 (not shown in FIG. 9) may at this point be formed in the manner described above for via 50.

Figure 9I:
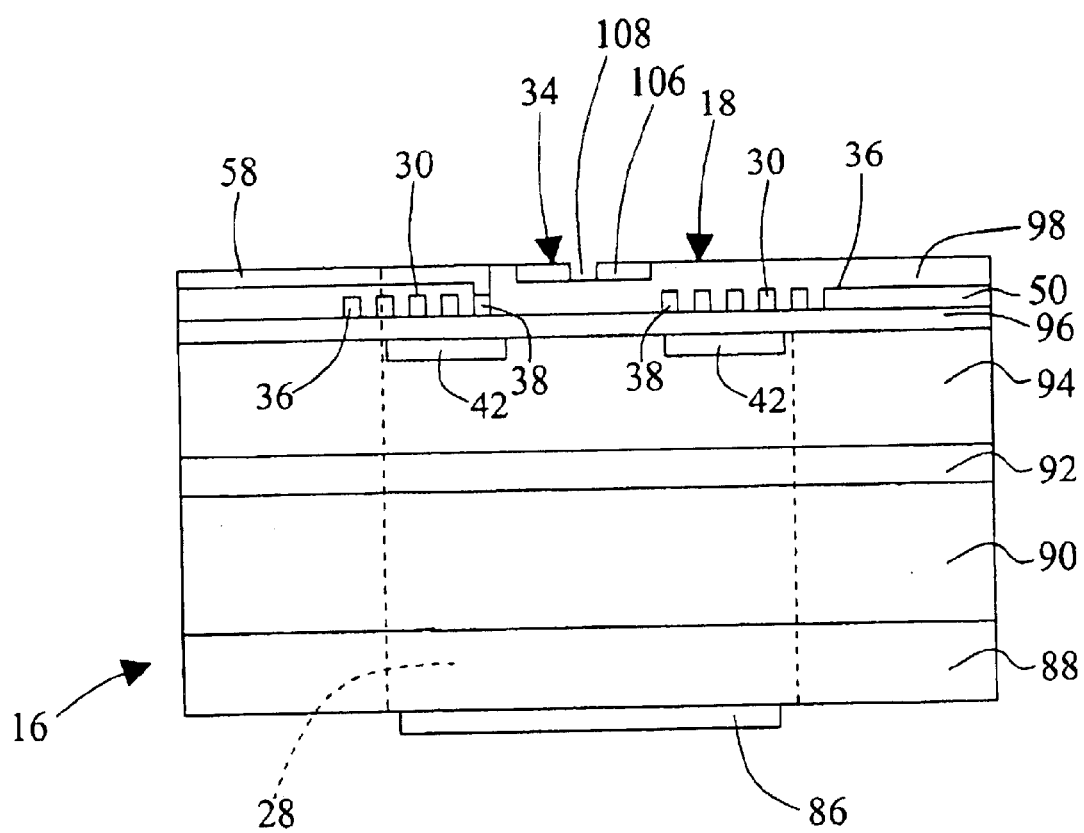

Referring next to FIG. 9H, photoresist P is again applied to p-surface 20 and is patterned and developed according to the structure and configuration of emission facet 34 of laser 28. The p-surface 18 is then etched, and a metal layer 106 deposited thereon which conforms generally to the structure and configuration of emission facet 34. Photoresist P is then stripped, and, as shown in FIG. 9I, and an aperture 108 is etched in metal layer 106 and emission facet 34 via focussed ion beam (FIB) machining. Alternatively, photoresist may again be applied to p-surface 18 and suitably patterned and developed to allow etching of aperture 108.

Referring again to FIG. 4, the fabrication conductor elements 66, 76, and conductive vias 70, 80 are formed in generally the same manner as described above. The fabrication of conductive elements 66, 76 and vias 70, 80 may, for example, be carried out concurrently with the fabrication of conductor 58 and via 60. Thus, the same events in which p-surface 18 is being etched to accommodate conductor element 58, etching is also carried out to accommodate conductors 66, 76.

Referring again to FIG. 5, fabrication of GMR element 32 is generally carried out before formation of dielectric layers 96, 98, by suitably patterning the outer surface of DBR stack 94 with photoresist and anisotropically etching a notch or trench (also not shown) of "V"-shaped cross-section into DBR stack 94 which will ultimately accommodate GMR element 32. The walls of the trench preferably forma an angle of approximately thirty five degrees to a line (not shown) normal to surface 22. The depth of the trench must be sufficient to allow fabrication of all layer components of GMR sensor 32 within the trench. Buffer or passivation layer 39 is deposited in the trench by conventional deposition, and may comprise the same dielectric material as layer 96 or layer 98. In FIG. 5, the buffer layer 39 in the V-shaped trench is shown as generally contiguous with dielectric layer 98. The size of GMR element 32, as well as other portions of optical head The active region 38 of GMR element, as noted above, comprises several layers or laminates (not shown) which include, in order from deepest to shallowest layers, a first layer of ferromagnetic metal or metal alloy, a layer of non-magnetic metal or metal alloy, a second layer of ferromagnetic metal or metal alloy, and a pinning layer of anti-ferromagnetic material. Preferably, a layer of soft magnetic material is included below the innermost ferromagnetic layer, adjacent buffer 39, and a layer of soft magnetic material is included above the anti-ferromagnetic layer proximate to outer surface 22. As related above, the first ferromagnetic layer will comprise NiFe, the non-magnetic metal comprises Cu, the second ferromagnetic layer comprises Co, and the anti-ferromagnetic layer comprises FeMn, with individual magnetic layers are generally on the order of ten nanometers thickness, while the non-magnetic layer is approximately two nanometers thick. The structure and fabrication of GMR elements suitable for use with the invention are well known in the art and are disclosed in further detail by C. Tsang et al. in IEEE Trans. Mag., MAG-30, p. 3910 (1994), as noted above.

The fabrication of GMR element 32 may be carried out concurrently with one or more of the various fabrication events associated with the laser 28 and magnetic coil 30 of the magnetic optical function region 14 as described above and shown in FIG. 8 and FIG. 9. Once again, it should be kept in mind that the particular process details of FIG. 8 and FIG. 9 are only exemplary, and may be varied in numerous aspects, as should be readily understood by those skilled in the art.

Figure 10:
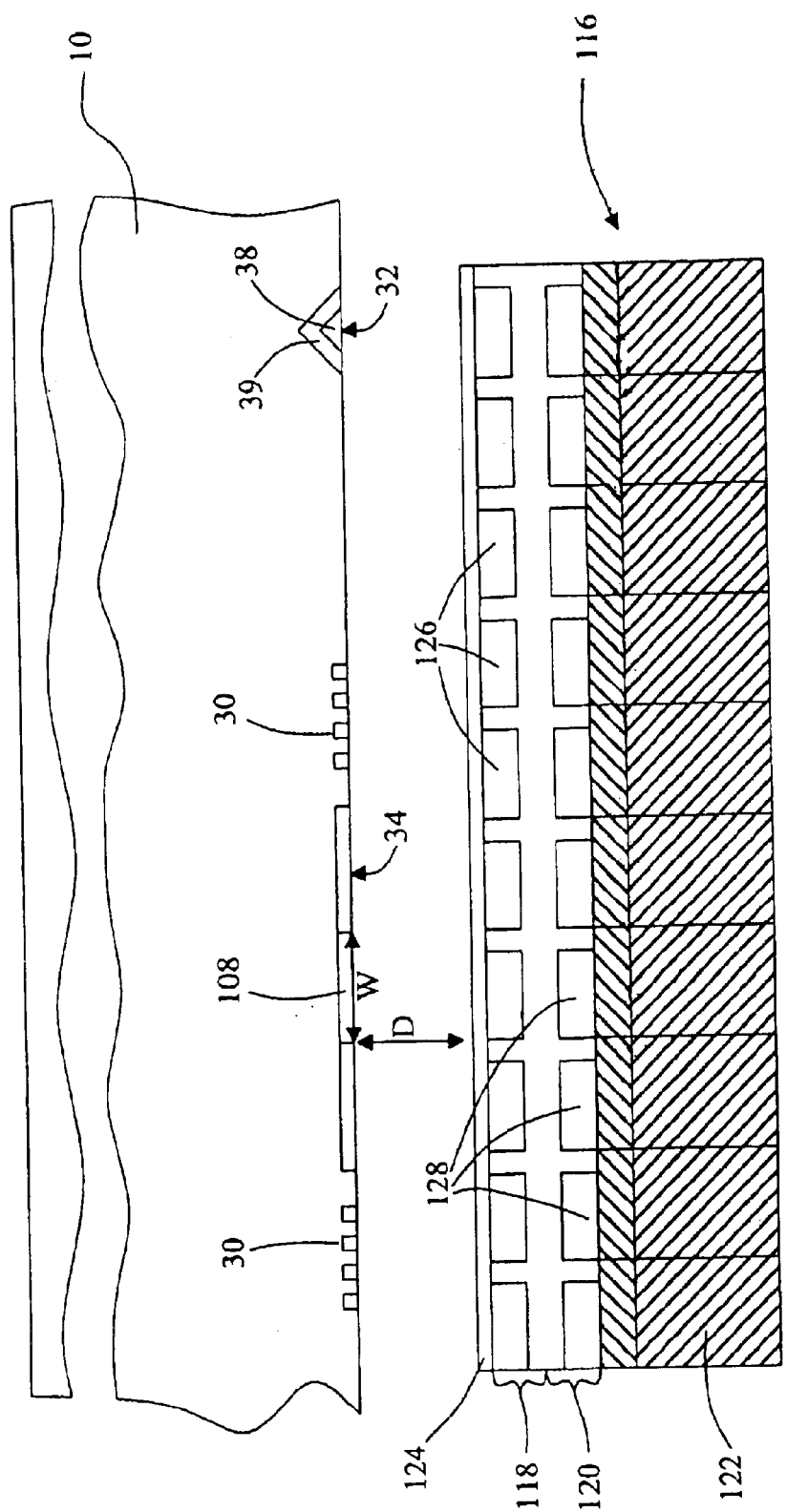
FIG. 10 is a schematic side view of the magnetic-optical head of FIG. 1 shown together with a magneto-optic medium in accordance with the present invention.

Referring now to FIG. 10, the magnetic optical head 10 of the invention is shown schematically with a magneto-optic recording medium 116. It should be kept in mind that the distances and thickness in FIG. 10 have been exaggerated for clarity, and are not necessarily shown to scale. Recording medium 116 includes generally a readout layer 118, a recording layer 120, and a base or substrate 122. A protective overlayer or outer coating 124 covers readout layer 118. A layer of lubricant (not shown) will generally be included above outer protective layer 124. A plurality of magnetic domains 126 are defined in readout layer 118, and a corresponding plurality of magnetic domains 128 are defined in the memory or recording layer 120, with each magnetic domain 126 in readout layer 118 positioned directly over a corresponding magnetic domain 128 in the memory layer 120.

The readout layer 118 may comprise, for example, a TbDyFeCo alloy, a GdFeCo alloy, or the like. Memory layer 120 may comprise a TbFeCo alloy, a DyFeCo alloy, or the like. The readout and memory layers 118, 120 may be of the same or different thickness. Outer protective coating 124 may comprise silicon nitride or a like material. An inner protective coating of silicon nitride or a like material (not shown) is also preferably included proximate to the memory layer. Substrate 122 may comprise polycarbonate, glass, or like substrate material. Magneto-optic media of this type are well known in the art, and need not be described in further detail herein.

In operation, magnetic optical head 10 is flown over medium 116, and writing is carried out thermomagnetically to form domains 126, 128, with light from laser 28 selectively heating portions of medium 116, and with a magnetic field associated with a current passing through coil 30 providing a direction of magnetization to the heated portions to form domains 126, 128. The material of memory layer 120 preferably has a relatively high coercivity at ambient temperature. As a result, domains 126 and 128 are stable and not susceptible to the influence of stray magnetic fields. For thermomagnetic writing, the coercitivy of memory layer 120 must decrease rapidly upon heating. These properties are provided by ferrielectric materials such as TbFeCo noted above. Problems associated with low magnetization at ambient temperature can be mitigated by placing the readout layer 118 in close proximity to memory layer 120. The material of readout layer 118 preferably is formulated to provide a relatively large magnetization at ambient temperature. The direction of magnetization in the readout layer 118 is determined by the magnetic moments in the underlying memory layer 120.

During readout, magnetic optical head 10 is flown over medium 116 so that GMR read element 32 passes over the read and memory layers 118, 120. The domains 126 of readout layer 118 generally copy the magnetization state of the corresponding domains 128 of memory layer 120, to provide a magnetic flux detectable by GMR read element 32.

Magnetic optical head 10 and magnetic optical medium 116 are positioned, during reading and writing, such that emission facet 48 and the surface of read layer 118 are separated by an optical path-length d defined generally by $d = \int n(z)dz$, where z measures the distance between aperture 108 and read layer 118, and $n(z)$ is the index of refraction as a function of distance z, which comprises generally the refractive index of the air gap and outer layer 124, as well as any additional material layers between outer layer 124 and read layer 118. In some preferred near field embodiments of the invention, the path-length d, during read and write operations, is generally less than the wavelength $\lambda$ emitted by laser 28. In other preferred embodiments, the optical path length d will be generally less than or equal to w/2, with w being the width of aperture 108. The aperture width w is preferably dimensioned such that $w < \lambda/2$.

Figure 11:
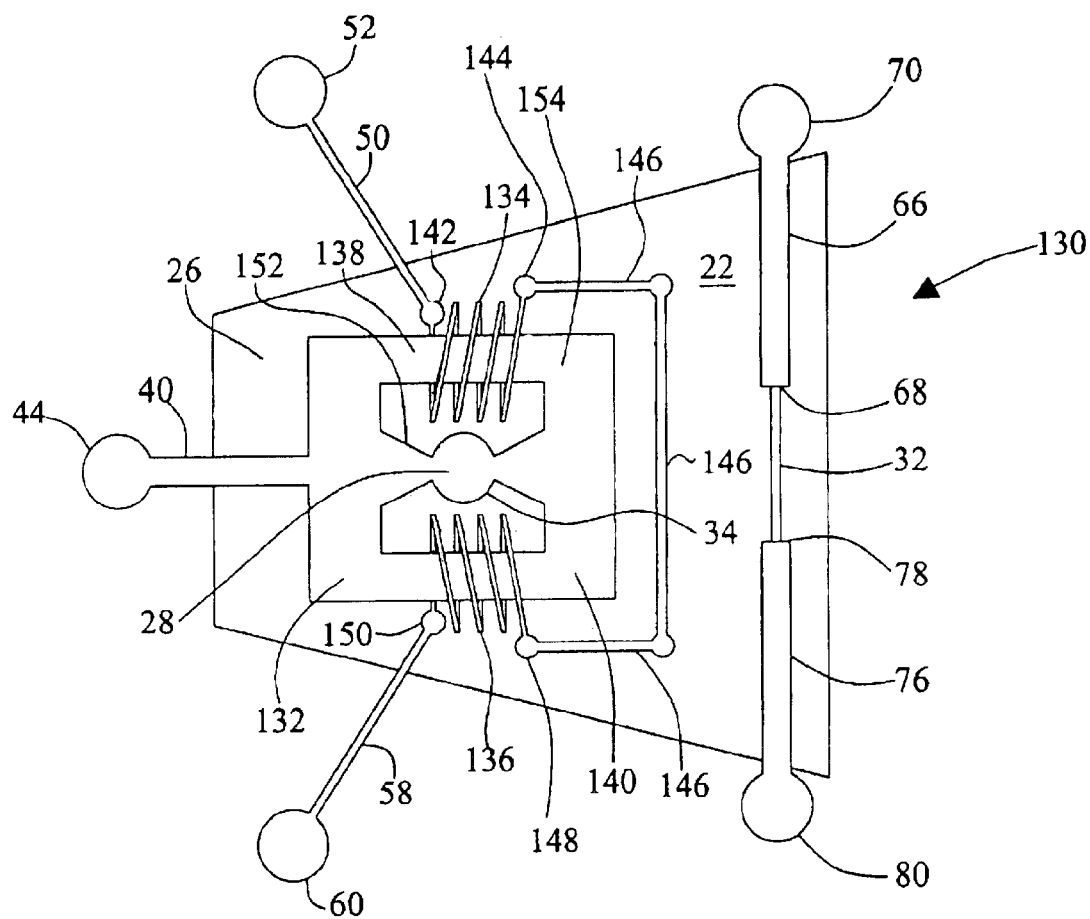
FIG. 11 is a bottom plan view of another preferred embodiment of a magnetic-optical function region of a monolithic, hybrid magnetic-optical head in accordance with the invention.

Referring next to FIG. 11, an alternate embodiment magnetic optical function region 130 of a hybrid magnetic optical head in accordance with the invention is shown, with like reference numbers used to denote like parts. In the region 120, the magnetic field biasing element comprises a yoke 132 of soft magnetic material such as "Permalloy" or the like, together with first and second conducting coils 134, 136. First conducting coil 134 spirals about or surrounds a first arm 138 of yoke 132, while second conducting coil 136 spirals about or surrounds a second arm 140 of yoke 132.

First conducting coil 134 includes a first terminal 142 which is electrically coupled to conductor element 50, which in turn is electrically coupled to conductive via 52 as described above. A second terminal 144 is electrically coupled to a conductor element 146 which extends partially around yoke 132 and electrically couples to a first terminal 148 of second conducting coil 136. A second terminal 150 of second conducting coil is electrically coupled to conductor element 58, and hence to conductive via 60. Yoke 132 includes a pair of focusing elements or protrusions 152, 154 positioned on opposite sides of the emission facet 34 of laser 28. The magnetic optical function region 130 is associated with a slider region which is generally the same as described above for slider region 12. The magnetic optical function region 130 and slider regions are integral portions of a hybrid magnetic optical head in accordance with the invention.

As noted above, the magnetic field biasing element of the invention is preferably recessed with respect to the laser emission facet 34 and air bearing surface 22. Thus, a portion of the insulating layer 26 has been omitted in FIG. 11 in order to more clearly show the conducting coils, 134, 136, soft magnetic yoke 132, and conductor element 146. The relative sizes and distances in FIG. 11, it should be noted, are generally exaggerated for reason of clarity, and are not necessarily shown to scale.

The magnetic-optical function region 130 is structured and configured for thermally assisted magnetic writing on a magnetic optical medium, wherein writing is carried out primarily by, modulation of magnetic field, together with assistance of a laser which heats the medium to reduce the medium coercivity and thereby assist in the magnetic recording. The position, size and shape of each magnetization region or domain within a storage medium is controlled primarily by the gradient of the applied magnetic field provided by yoke 132 as current flows through coils 134, 136. In this regard, focusing protrusions 152, 154 are included on yoke 132 so that the associated magnetic field is rigorously confined to the space adjacent to emission facet 34. Thus, in writing on a magnetic optical medium such as the medium 116 described above, the applied optical field from laser emission facet 34 serves to heat the medium and reduce the coercivity of medium material, to thermally assist the magnetic recording provided by a modulated magnetic field provided by yoke 132 and coils 134, 136.

The magnetic optical function region 130 may be fabricated in a manner similar to that described above for the magnetic optical function region 14. In the case of magnetic optical function region 130, yoke 132 and coils 134, 136 are somewhat flattened in shape to facilitate their formation by deposition of layers of material by conventional deposition techniques. Generally, the lower or bottom portions of coil would first be deposited as strips or portions of conductor. The yoke material may then be deposited thereabove. Finally, upper or top strips of conductor material are then deposited which electrically contact the corresponding underlying conductive strips, to define coils 134, 136 of conducting material which surround arms 138, 140 of yoke 132.

Various other embodiments of a hybrid magnetic optical head as provided by the present invention will suggest themselves to those skilled in the art upon review of this disclosure. For example, the magnetic field biasing element and magnetic sensor element may alternatively be structured and configured for use with edge emitting and corner emitting semiconductor lasers. These, and other embodiments, are considered to be within the scope of the present invention.

Accordingly, it will be seen that this invention provides a near-field hybrid magnetic optical head apparatus and method wherein one or more solid state lasers, magnetic field biasing elements, magnetic sensing elements, and an aerodynamically shaped slider comprise a single integrated, monolithic device fabricated from the same base semiconductor material into an optical head. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. The magnetic optical head apparatus comprising:
   a monolithic semiconductor substrate;
   at least one semiconductor laser, said semiconductor laser integral with said monolithic semiconductor substrate;

at least one magnetic field biasing element, said magnetic field biasing element integral with said monolithic semiconductor substrate; and a slider, said slider integral with said monolithic substrate, said slider including an air bearing surface, wherein said magnetic field biasing element is recessed with respect to an emission facet of said semiconductor laser.

2. The magnetic optical head apparatus comprising:

a monolithic semiconductor substrate;

at least one semiconductor laser, said semiconductor laser integral with said monolithic semiconductor substrate;

at least one magnetic field biasing element, said magnetic field biasing element integral with said monolithic semiconductor substrate; and a slider, said slider integral with said monolithic substrate, said slider including an air bearing surface, wherein said monolithic semiconductor substrate comprises:

(a) a first conductivity-type base layer;

(b) a first conductivity-type clad layer adjacent said first conductivity-type semiconductor layer;

(c) an active region layer adjacent said first conductivity-type clad layer;

(d) a second conductivity-type clad layer adjacent said active region layer; and (e) an insulating layer adjacent said second conductivity-type clad layer.

3. The magnetic optical head apparatus of claim 2, further comprising:

(a) a first side electrical contact associated with said first conductivity-type clad layer on a first side of said semiconductor substrate;

(b) a second side electrical contact associated with said second conductivity-type clad layer on an second side of said semiconductor substrate; and (c) said first side electrical contact and said second side electrical contact defining a diode.

4. The magnetic optical head apparatus of claim 3, wherein said first side electrical contact and said second side electrical contact are electrically accessible from a portion of said semiconductor substrate which is remote from said air bearing surface.

5. The magnetic optical head apparatus of claim 3, wherein said first side electrical contract and said second side electrical contact are electrically accessible from a first side of said semiconductor substrate, said first side being substantially opposite said air bearing surface.

6. The magnetic optical head apparatus of claim 3, wherein said first side electrical contact is electrically accessible from a side of said semiconductor substrate which is opposite said air bearing surface, and said second side electrical contact is electrically accessible from a side of said semiconductor substrate which is substantially normal to said air bearing surface.

7. The magnetic optical head apparatus of claim 3, wherein said second side electrical contact further comprises a conductive via, said conductive via extending through said first conductivity-type base layer, said first conductivity-type clad layer, said active region layer and said second conductivity-type clad layer, said via communicating with said first side of said semiconductor substrate.

8. The magnetic optical head apparatus of claim 2, wherein:

(a) said first conductivity-type clad layer comprises a first conductivity-type distributed Bragg reflector mirror stack;

(b) said active region layer comprises a plurality of quantum well and quantum barrier structures; and (c) said second conductivity-type clad layer comprises a second conductivity-type distributed Bragg reflector mirror stack.

9. The magnetic optical head apparatus comprising:

a monolithic semiconductor substrate;

at least one semiconductor laser, said semiconductor laser integral with said monolithic semiconductor substrate;

at least one magnetic field biasing element, said magnetic field biasing element integral with said monolithic semiconductor substrate; and a slider, said slider integral with said monolithic substrate, said slider including an air bearing surface, wherein said laser includes an emission facet having an aperture therein.

10. The magnetic optical head apparatus of claim 9, wherein said semiconductor laser has an output wavelength $\lambda$, and said aperture has a width w, such that $w<\lambda$.

11. The magnetic optical head apparatus of claim 10, wherein $w<\lambda/2$.

12. The magnetic optical head apparatus of claim 10, wherein at least 50% of output power from said emission facet is directed through said aperture.

13. The near-field magnetic optical system comprising:

a magnetic optical head, said magnetic optical head comprising a single, monolithic semiconductor substrate; said magnetic optical head including a semiconductor laser, said semiconductor laser integral to said monolithic semiconductor substrate; said magnetic optical head including a magnetic field biasing element associated with said semiconductor laser, said magnetic field biasing element integral to said monolithic semiconductor substrate; said magnetic optical head including a magnetic sensor element, said magnetic sensor element integral to said monolithic semiconductor substrate; and said optical head including a slider, said slider integral to said monolithic substrate; and a magnetic optical medium, said magnetic optical medium positioned adjacent said magnetic optical head, said magnetic optical medium including read layer, said magnetic optical medium including a memory layer, wherein said semiconductor laser includes an emission facet positioned adjacent said magnetic optical medium, said emission facet including an aperture therein, said aperture having a width w which is smaller than an output wavelength $\lambda$ of said semiconductor laser.

14. The near-field optical system of claim 13, wherein said read layer in said magnetic optical medium is separated from said emission facet of said semiconductor laser by an optical path-length d, wherein d is less than said output wavelength $\lambda$.

15. The near-field optical system of claim 14, wherein $w<\lambda/2$, and wherein $d<w/2$.

16. The near-field magnetic optical method comprising:

providing a magnetic optical head, said magnetic optical head comprising a single, monolithic semiconductor substrate, said magnetic optical head including at least one semiconductor laser, at least one magnetic field biasing element, at least one magnetic sensor element, and a slider, said semiconductor laser, said magnetic field biasing element, said magnetic sensor element and said slider integral to said monolithic substrate; and positioning a magnetic optical medium adjacent said magnetic optical head and flying said magnetic optical head over said magnetic optical medium, said magnetic optical medium including a read layer and a memory layer, wherein said semiconductor laser comprises an emission facet having an aperture therein, said aperture having a width w which is smaller than an output wavelength $\lambda$ of said laser.

17. The near-field optical method of claim 16, wherein said positioning of said optical head is carried out by positioning said emission facet apart from said read layer by an optical path length d, wherein said optical path-length d is smaller than said output wavelength $\lambda$.

18. The method for making an optical head, comprising:

preparing a semiconductor substrate;

defining a slider region an said semiconductor substrate; and defining a magnetic optical function region on said semiconductor substrate, wherein said preparing said semiconductor substrate comprises:

(a) providing a base layer of first conductivity-type semiconductor;

(b) depositing an first conductivity-type clad layer on said base layer of first conductivity-type semiconductor;

(c) depositing an active region layer on said first conductivity-type clad layer; and (d) depositing a second conductivity-type clad layer on said active region layer;

(e) said base layer defining a first side of said semiconductor substrate, said second conductivity type layer defining a second side of said semiconductor substrate.

19. The method of claim 18, wherein said defining said magnetic optical function region comprises:

(a) depositing a second side electrical contact on second conductivity-type clad layer, said second side contact configured to define an emission facet for said laser region, said second side electrical contact positioned lower than said emission facet; and (c) depositing a first side electrical contact adjacent said first conductivity-type semiconductor layer;

(d) said second side electrical contact and said first side electrical contact being structured and configured to define a diode structure a semiconductor laser.

20. The method of claim 19, wherein said defining said magnetic optical function region further comprises forming a conductive coil surrounding said emission facet of said semiconductor laser.

21. The method of claim 20, wherein said defining said magnetic optical function region further comprises forming a giant magneto-resistive read element proximate said second side of said semiconductor substrate.

* * * * *